United States Patent
Li et al.

(10) Patent No.: US 11,818,601 B2
(45) Date of Patent: Nov. 14, 2023

(54) MEASUREMENT METHOD AND APPARATUS

(71) Applicant: Huawei Technologies Co., Ltd., Shenzhen (CN)

(72) Inventors: Bingzhao Li, Beijing (CN); Li Chai, Shenzhen (CN); Lei Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/039,351

(22) Filed: Sep. 30, 2020

(65) Prior Publication Data

US 2021/0014718 A1 Jan. 14, 2021

Related U.S. Application Data

(63) Continuation of application No. PCT/CN2019/081016, filed on Apr. 2, 2019.

(30) Foreign Application Priority Data

Apr. 4, 2018 (CN) .......................... 201810300767.4

(51) Int. Cl.
*H04J 11/00* (2006.01)
*H04W 24/08* (2009.01)
(Continued)

(52) U.S. Cl.
CPC ......... *H04W 24/10* (2013.01); *H04J 11/0083* (2013.01); *H04J 11/0093* (2013.01);
(Continued)

(58) Field of Classification Search
CPC ......... H04B 7/02–0495; H04B 17/0082–3913; H04J 11/0023–0093;
(Continued)

(56) References Cited

U.S. PATENT DOCUMENTS 8,861,444 B2 10/2014 Shang et al.
10,462,712 B2 10/2019 Jha et al.
(Continued)

FOREIGN PATENT DOCUMENTS

CN 101321355 A 12/2008
CN 102098696 A 6/2011
(Continued)

OTHER PUBLICATIONS

Huawei, HiSilicon, "Automatic Neighbour Relation in NR", 3GPP TSG RAN WG2 #101, R2-1802804, Feb. 26-Mar. 2, 2018, 6 pages, Athens, Greece.
(Continued)

*Primary Examiner* — Timothy J Weidner
(74) *Attorney, Agent, or Firm* — Slater Matsil, LLP

(57) ABSTRACT

This application provides a measurement method and an apparatus. In the measurement method, a communications apparatus may receive configuration information, where the configuration information includes a cell list and indication information, and the indication information is used to indicate whether a measurement event is affected by the cell list; and the communications apparatus performs a measurement evaluation based on the cell list and the indication information. In this implementation, whether to perform a trigger evaluation for a measurement result of a cell in the cell list may be determined depending on whether the measurement event is affected by the cell list, to avoid an unnecessary trigger evaluation for a cell.

24 Claims, 12 Drawing Sheets

(51) Int. Cl.
| | |
|---|---|
| *H04W 24/10* | (2009.01) |
| *H04W 36/00* | (2009.01) |
| *H04W 56/00* | (2009.01) |
| *H04W 72/00* | (2023.01) |
| *H04W 76/11* | (2018.01) |
| *H04W 76/15* | (2018.01) |
| *H04W 84/02* | (2009.01) |
| *H04W 88/02* | (2009.01) |
| *H04W 88/08* | (2009.01) |
| *H04W 88/12* | (2009.01) |
| *H04W 92/02* | (2009.01) |
| *H04W 92/10* | (2009.01) |
| *H04W 92/12* | (2009.01) |
| *H04W 92/20* | (2009.01) |
| *H04W 72/27* | (2023.01) |
| *H04W 72/231* | (2023.01) |

(52) U.S. Cl.
CPC ....... *H04W 24/08* (2013.01); *H04W 36/0083* (2013.01); *H04W 36/0094* (2013.01); *H04W 56/001* (2013.01); *H04W 56/0015* (2013.01); *H04W 72/231* (2023.01); *H04W 72/27* (2023.01); *H04W 76/11* (2018.02); *H04W 76/15* (2018.02); *H04W 84/02* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01); *H04W 92/20* (2013.01)

(58) Field of Classification Search
CPC .. H04J 2011/0003–0096; H04L 5/0001–0098; H04W 8/18–245; H04W 24/02–10; H04W 28/02–26; H04W 36/0005–385; H04W 48/02–20; H04W 56/0005–0025; H04W 72/005–14; H04W 76/10–50; H04W 84/02–16; H04W 88/005–18; H04W 92/02; H04W 92/04; H04W 92/10; H04W 92/12; H04W 92/16; H04W 92/20; H04W 92/22
See application file for complete search history.

(56) References Cited

U.S. PATENT DOCUMENTS

| | | | | |
|---|---|---|---|---|
| 2014/0024306 | A1* | 1/2014 | Redana | H04W 8/26 |
| 2016/0205575 | A1 | 7/2016 | Jung et al. | |
| 2017/0055187 | A1 | 2/2017 | Kang et al. | |
| 2017/0111886 | A1 | 4/2017 | Kim et al. | |
| 2017/0127299 | A1 | 5/2017 | Engström et al. | |
| 2019/0357095 | A1* | 11/2019 | Pakniat | H04W 36/0061 |

FOREIGN PATENT DOCUMENTS

| | | |
|---|---|---|
| CN | 102377462 A | 3/2012 |
| CN | 103596218 A | 2/2014 |
| CN | 103797856 A | 5/2014 |
| CN | 103858482 A | 6/2014 |
| CN | 105557013 A | 5/2016 |
| CN | 106332174 A | 1/2017 |
| CN | 106792884 A | 5/2017 |
| EP | 2814279 A1 | 12/2014 |
| WO | 2011000268 A1 | 1/2011 |
| WO | 2017039372 A1 | 3/2017 |
| WO | 2019072902 A1 | 4/2019 |

OTHER PUBLICATIONS

Huawei, "Cell selection for NR non-standalone and NR standalone UE operation", 3GPP TSG RAN WG2 #96, R2-168569, Nov. 14-18, 2016, 6 pages, Reno, Nevada.

Ericsson, "Content of the NR Master Information Block (NR-MIB)", 3GPP TSG RAN WG2 Ad Hoc on NR#2, Tdoc R2-1706493, Jun. 27-29, 2017, 6 pages, Qingdao, China.

3GPP TS 36.423 V15.0.0 (Dec. 2017),3rd Generation Partnership Project;Technical Specification Group Radio Access Network;Evolved Universal Terrestrial Radio Access Network(E-UTRAN);X2 application protocol (X2AP)(Release 15), 350 pages.

3GPP TS 36.331 V15.0.1 (Jan. 2018), 3rd Generation Partnership Project; Technical Specification Group Radio Access Network; Evolved Universal Terrestrial Radio Access (E-UTRA); Radio Resource Control (RRC); Protocol specification (Release 15), Jan. 9, 2018, 776 pages.

3GPP TS 38.211 V15.1.0 (Mar. 2018), 3rd Generation Partnership Project; Technical Specification Group Radio Access Network; NR; Physical channels and modulation (Release 15), total 90 pages.

3GPP TS 38.212 V15.0.0 (Dec. 2017), 3rd Generation Partnership Project; Technical Specification Group Radio Access Network; NR; Multiplexing and channel coding (Release 15), total 82 pages.

3GPP TS 38.213 V15.0.0 (Dec. 2017), 3rd Generation Partnership Project; Technical Specification Group Radio Access Network; NR; Physical layer procedures for control (Release 15), total 56 pages.

3GPP TS 38.300 V15.1.0 (Mar. 2018), 3rd Generation Partnership Project; Technical Specification Group Radio Access Network; NR; NR and NG-RAN Overall Description; Stage 2 (Release 15), total 71 pages.

3GPP TS 38.331 V15.1.0 (Mar. 2018), 3rd Generation Partnership Project; Technical Specification Group Radio Access Network; NR; Radio Resource Control (RRC) protocol specification (Release 15), total 268 pages.

3GPP TS 38.423 V0.7.0 (Mar. 2018), 3rd Generation Partnership Project; Technical Specification Group Radio Access Network; NG-RAN; Xn application protocol (XnAP) (Release 15), total 81 pages.

3GPP TS 38.304 v1.0.0 (Mar. 2018), 3rd Generation Partnership Project; Technical Specification Group Radio Access 7 Network; NR; User Equipment (UE) procedures in Idle mode and RRC Inactive state (Release 15), total 21 pages.

Pu, Ling-min et al, "Research on Optimization of Home eNodeB Handover Performance in LTE System", Mar. 27, 2013, School of Electrical Engineering Institute, Chien-shiung Institute of Technlogy, 5 pages, Taicang Jiangsu, China.

3GPP TS 38.215 V15.1.0 (Mar. 2018), 3rd Generation Partnership Project; Technical Specification Group Radio Access Network; NR; Physical layer measurements (Release 15), Mar. 2018, Sophia Antipolis, Valbonne—France, 15 pages.

3GPP TS 38.133 V15.0.0 (Dec. 2017), 3rd Generation Partnership Project; Technical Specification Group Radio Access Network; NR; Requirements for support of radio resource management (Release 15), Dec. 2017, Sophia Antipolis, Valbonne—France, 41 pages.

3GPP TS 36.300 V15.1.0 (Mar. 2018), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Mar. 2018, Sophia Antipolis, Valbonne—France, 341 pages.

3GPP TS 36.331 V15.1.0 (Mar. 2018), 3rd Generation Partnership Project; Technical Specification Group Radio Access Network; Evolved Universal Terrestrial Radio Access (E-UTRA); Radio Resource Control (RRC); Protocol specification (Release 15), Mar. 2018, Sophia Antipolis, Valbonne—France, 786 pages.

* cited by examiner

MEASUREMENT METHOD AND APPARATUS

CROSS-REFERENCE TO RELATED APPLICATIONS

This application is a continuation of International Application No. PCT/CN2019/081016, filed on Apr. 2, 2019, which claims priority to Chinese Patent Application No. 201810300767.4, filed on Apr. 4, 2018. The disclosures of the aforementioned applications are hereby incorporated by reference in their entireties.

TECHNICAL FIELD

This application relates to the field of communications technologies, and in particular, to a measurement method and an apparatus.

BACKGROUND

Currently, during cell measurement, a network device pre-configures measurement information for a terminal, and notifies the terminal of the measurement information, so that the terminal performs measurement reporting based on the measurement information. For example, FIG. 1 shows an existing measurement information configuration manner. As shown in FIG. 1, measurement information is indexed by using a measurement identifier, each measurement identifier is associated with one measurement object and one measurement reporting configuration, one measurement object includes one measurement frequency, reference information, a blacklist, a whitelist, and the like, and one measurement reporting configuration includes a type of measurement reporting, for example, periodicity reporting, event reporting, or cell ID reporting. Event reporting may further include a plurality of events, for example, A series events (A1 to A6) or B series events (B1, B2). The measurement reporting configuration is performed for a measurement object associated with the measurement identifier. To be specific, periodicity reporting, event reporting, or cell ID reporting in the measurement reporting configuration is performed for one measurement object. In this way, if a whitelist is configured for the measurement object, the terminal performs measurement on a measurement frequency of the measurement object, and considers measurement results of all cells in the whitelist when performing a trigger evaluation for the measurement reporting configuration.

However, actually, measurement results of some cells in the whitelist do not need to be considered in some trigger evaluations in the measurement reporting configuration. For example, in event reporting, an A3 event (where a reference signal received signal power RSRP of a neighboring cell is greater than an RSRP of a current primary cell), an A4 event (where an RSRP of a primary cell is greater than a specific threshold), or an A5 event (where an RSRP of a primary cell is less than a specific threshold, but an RSRP of a neighboring cell is greater than a specific threshold) is used to assist in primary component carrier switching, a A6 event (where an RSRP of a neighboring cell is greater than an RSRP of a secondary cell by a specific threshold) is used to assist in secondary component carrier switching. A non-independent cell cannot be configured as a primary component carrier. Therefore, measurement results of the non-independent cell should not be considered in trigger evaluations for the A3, A4, and A5 events. Therefore, using the foregoing whitelist mechanism causes an unnecessary trigger evaluation, resulting in wasting processing resources of the terminal.

SUMMARY

This application provides a measurement method and an apparatus, to reduce processing resources of a terminal.

According to an aspect, this application provides a measurement method. The measurement method includes: receiving, by a communications apparatus, configuration information, where the configuration information includes a cell list and indication information, and the indication information is used to indicate whether a measurement event is affected by the cell list; and performing, by the communications apparatus, a measurement evaluation based on the cell list and the indication information.

That the measurement event is affected by the cell list refers to that the communications apparatus does not need to consider a measurement result of a cell in the cell list in a trigger evaluation for the measurement event. That the measurement event is not affected by the cell list refers to that the communications apparatus needs to consider a measurement result of a cell in the cell list in a trigger evaluation for the measurement event. Alternatively, that the measurement event is affected by the cell list refers to that the communications apparatus needs to exclude a measurement result of a cell in the cell list from a measurement result when determining, based on the measurement result, whether the measurement event is triggered. That the measurement event is not affected by the cell list refers to that the communications apparatus does not need to exclude a measurement result of a cell in the cell list from a measurement result when determining, based on the measurement result, whether the measurement event is triggered.

Therefore, the communications apparatus may not consider the cell in the cell list when performing a trigger evaluation for a measurement event affected by the cell list. In other words, before performing the trigger evaluation on the measurement event affected by the cell list, the communications apparatus may exclude the measurement result of the cell in the cell list, so that the communications apparatus is prevented from performing an unnecessary trigger evaluation. This reduces processing resources of the communications apparatus.

The configuration information further includes a measurement object and measurement event configuration information, the measurement object is a measurement object that includes the cell list, and the measurement event configured in the measurement event configuration information is a measurement event associated with the measurement object. That is, when the measurement object is measured, it needs to be determined whether an obtained measurement result triggers the measurement event. There may be a plurality of measurement events configured in the measurement event configuration information. That is, there may be a plurality of measurement events associated with the measurement object. In this way, the communications apparatus may determine, based on the measurement result of the measurement object, whether each of the plurality of measurement events is triggered.

In an implementation, the performing, by the communications apparatus, a measurement evaluation based on the cell list and the indication information may include: determining, by the communications apparatus based on the indication information, whether the measurement event associated with the measurement object is affected by the cell list; measuring, by the communications apparatus, the measurement object when the measurement event associated with the measurement object is affected by the cell list, to obtain a measurement result, and excluding a measurement result of a cell in the cell list from the measurement result; and determining, by the communications apparatus based on the measurement result, whether the measurement event associated with the measurement object is triggered. In this way, when determining, based on the measurement result, whether the measurement event associated with the measurement object is triggered, the communications apparatus does not need to evaluate the measurement result of the cell in the cell list. Therefore, this reduces processing resources of the communications apparatus.

In an implementation, a blacklist is further configured for the measurement object. In this case, the performing, by the communications apparatus, a measurement evaluation based on the cell list and the indication information may include: determining, by the communications apparatus based on the indication information, whether the measurement event associated with the measurement object is affected by the cell list; measuring, by the communications apparatus, the measurement object when the measurement event associated with the measurement object is affected by the cell list, to obtain a measurement result, and excluding a measurement result of a cell in the cell list and a measurement result of a cell in the blacklist from the measurement result; and determining, by the communications apparatus based on the measurement result, whether the measurement event associated with the measurement object is triggered. In this way, when determining, based on the measurement result, whether the measurement event associated with the measurement object is triggered, the communications apparatus does not need to evaluate the measurement result of the cell in the cell list and the measurement result of the cell in the blacklist. Therefore, this reduces processing resources of the communications apparatus.

Correspondingly, when the measurement event associated with the measurement object is triggered, the communications apparatus does not report the cell in the cell list in measurement reporting, or does not report the cell in the cell list and the cell in the blacklist in measurement reporting. Therefore, signaling overheads required for the measurement reporting are reduced.

In an implementation, the indication information is included in the measurement event configuration information. In this way, the determining, by the communications apparatus based on the indication information, whether the measurement event associated with the measurement object is affected by the cell list includes: determining, by the communications apparatus when the measurement event configuration information includes the indication information, that the measurement event associated with the measurement object is affected by the cell list; or determining, by the communications apparatus when the measurement event configuration information does not include the indication information, that the measurement event associated with the measurement object is not affected by the cell list.

In an implementation, the indication information is configured in the measurement object. In this way, the determining, by the communications apparatus based on the indication information, whether the measurement event associated with the measurement object is affected by the cell list includes: determining, by the communications apparatus when the measurement event associated with the measurement object is of a type indicated by the indication information, that the measurement event associated with the measurement object is affected by the cell list; or determining, by the communications apparatus when the measurement event associated with the measurement object is not of a type indicated by the indication information, that the measurement event associated with the measurement object is not affected by the cell list.

In an implementation, the cell in the cell list is a non-independent cell, and the non-independent cell is a cell in which no system information is sent or a cell in which only a part of system information is sent. Therefore, the non-independent cell may work as a secondary component carrier instead of a primary component carrier. Therefore, in some measurement events, for example, a measurement event in which a signal measurement result of a neighboring cell is higher than a signal measurement result of a current primary cell, the measurement event is used to switch a primary component carrier. Therefore, in a trigger evaluation for the measurement event, the communications apparatus does not need to consider a measurement result of the non-independent cell. Compared with a case in which a whitelist is configured for a current measurement object and measurement results of all cells in the whitelist need to be considered for the measurement event, this may reduce processing resources of the communications apparatus. Further, the non-independent cell does not need to be carried in measurement reporting of the measurement event. Therefore, this can further reduce signaling overheads required for the measurement reporting.

Correspondingly, when the cell in the cell list is the non-independent cell, the cell in the cell list is not used as a cell selected by the communications apparatus when performing connection re-establishment or restoration.

In an implementation, the method further includes: receiving, by the communications apparatus, a request message, where the request message includes a first frequency and a first physical cell identifier (PCI), the request message is used to request a cell global identifier (CGI) of a first cell, and the first cell is a cell whose frequency is the first frequency and that is indicated by the first PCI; synchronizing, by the communications apparatus, a synchronization signal block of the first cell based on the first frequency and the first PCI; when the communications apparatus determines, based on content on a broadcast channel in the synchronization signal block of the first cell, that the first cell has no cell global identifier, obtaining, by the communications apparatus, a second PCI and a cell global identifier of a second cell associated with location information, where the location information is carried in the broadcast channel in the synchronization signal block of the first cell, and the second cell associated with the location information is a cell in which a cell global identifier is sent; and sending, by the communications apparatus, a response message for the request message, where the response message carries information about that the first cell has no cell global identifier, and a frequency, the second PCI, and the cell global identifier of the second cell. It can be learned that, in this implementation, for a cell in which no system information is sent, a cell global identifier of another associated cell may be reported, to implement an automatic neighbor relation (ANR). That is, a network device may obtain cell-related information by using the cell global identifier of the another cell associated with the cell.

According to another aspect, this application further provides a measurement method. The measurement method includes: determining, by a network device, configuration information, where the configuration information includes a cell list and indication information, and the indication information is used to indicate whether a measurement event is affected by the cell list; and sending, by the network device, the configuration information to a communications apparatus, where the configuration information is used for a measurement evaluation, so that the communications apparatus performs the measurement evaluation based on the cell list and the indication information.

For a further explanation that the measurement event is affected by the cell list or is not affected by the cell list, refer to related content in the foregoing aspect. Details are not described herein again.

In this implementation, the network device configures the cell list and the indication information for the communications apparatus, so that the communications apparatus may not consider a measurement result of a cell in the cell list in a trigger evaluation for a measurement event, to prevent the communications apparatus from performing an unnecessary trigger evaluation. This reduces processing resources of the communications apparatus.

The configuration information further includes a measurement object and measurement event configuration information, the measurement object is a measurement object that includes the cell list, and the measurement event configured in the measurement event configuration information is a measurement event associated with the measurement object.

In an implementation, the indication information is included in the measurement event configuration information, and when the measurement event configuration information includes the indication information, the measurement event associated with the measurement object is affected by the cell list; or when the measurement event configuration information does not include the indication information, the measurement event associated with the measurement object is not affected by the cell list. In this way, the communications apparatus may determine, depending on whether the measurement event configuration information of the measurement event includes the indication information, whether the measurement event is affected by the cell list.

In an implementation, the indication information is configured in the measurement object, and when the measurement event associated with the measurement object is of a type indicated by the indication information, the measurement event associated with the measurement object is affected by the cell list; or when the measurement event associated with the measurement object is not of a type indicated by the indication information, the measurement event associated with the measurement object is not affected by the cell list. In this way, the communications apparatus may determine, depending on whether the type of the measurement event is of the type indicated by the indication information, whether the measurement event is affected by the cell list.

In an implementation, the cell in the cell list is a non-independent cell, and the non-independent cell is a cell in which no system information is sent or a cell in which only a part of system information is sent. Therefore, the non-independent cell may work as a secondary component carrier instead of a primary component carrier. Therefore, in some measurement events, for example, a measurement event in which a neighboring cell is higher than a current primary cell, the measurement event is used to switch a primary component carrier. Therefore, in a trigger evaluation for the measurement event, the communications apparatus does not need to consider a measurement result of the non-independent cell. Compared with a case in which a whitelist is configured for a current measurement object and measurement results of all cells in the whitelist need to be considered for the measurement event, this may reduce processing resources of the communications apparatus. Further, the non-independent cell does not need to be carried in measurement reporting of the measurement event. Therefore, this can further reduce signaling overheads required for the measurement reporting.

Correspondingly, when the cell in the cell list is the non-independent cell, the cell in the cell list is not used as a cell selected by the communications apparatus when the communications apparatus performs connection re-establishment or restoration.

In an implementation, the method further includes: sending, by the network device, a request message, where the request message includes the first frequency and the first PCI, the request message is used to request a cell global identifier of the first cell, and the first cell is a cell whose frequency is the first frequency and that is indicated by the first PCI; and receiving, by the network device, a response message returned for the request message, where when the first cell has no cell global identifier, the response message carries information about that the first cell has no cell global identifier, and a frequency, a second PCI, and a cell global identifier of a second cell associated with the first cell. It can be learned that, in this implementation, for a cell in which no system information is sent, the network device may receive a cell global identifier of another cell associated with the cell, to implement an automatic neighbor relation (ANR). That is, the network device may obtain cell-related information by using the cell global identifier of the another cell associated with the cell.

According to still another aspect, this application further provides an information processing method. The information processing method includes: receiving, by a communications apparatus, a request message, where the request message includes a first frequency and a first physical cell identifier, the request message is used to request a cell global identifier of a first cell, and the first cell is a cell whose frequency is the first frequency and that is indicated by the first PCI; synchronizing, by the communications apparatus, a synchronization signal block of the first cell based on the first frequency and the first PCI; when the communications apparatus determines, based on content on a broadcast channel in the synchronization signal block of the first cell, that the first cell has no cell global identifier, obtaining, by the communications apparatus, a second PCI and a cell global identifier of a second cell associated with location information, where the location information is carried in the broadcast channel in the synchronization signal block of the first cell, and the second cell associated with the location information is a cell in which a cell global identifier is sent; and sending, by the communications apparatus, a response message for the request message, where the response message carries information about that the first cell has no cell global identifier, and a frequency, the second PCI, and the cell global identifier of the second cell. It can be learned that, in this implementation, for a cell in which no system information is sent, the network device may receive a cell global identifier of another cell associated with the cell, to implement an automatic neighbor relation (ANR). That is, the network device may obtain cell-related information by using the cell global identifier of the another cell associated with the cell.

In an implementation, the method further includes: when determining, based on the content on the broadcast channel in the synchronization signal block of the first cell, that the first cell has the cell global identifier, reading, by the communications apparatus, first system information block SIB 1 based on the content on the broadcast channel in the synchronization channel block of the first cell; obtaining, by the communications apparatus based on the first system information SIB 1, a frequency that corresponds to a frequency offset and that is in the SIB 1 and the cell global identifier of the first cell; and when the frequency corresponding to the frequency offset is different from the first frequency, sending, by the communications apparatus, a response message for the request message, where the response message carries the frequency corresponding to the frequency offset and the cell global identifier of the first cell, and the frequency corresponding to the frequency offset is used as a synchronization channel center frequency of the first cell. It can be learned that when a cell has a cell global identifier, the communications apparatus may further determine a synchronization channel center frequency of the cell based on the frequency offset in the SIB 1, and report both the synchronization channel center frequency and the cell global identifier of the cell together.

According to still another aspect, this application further provides an information processing method. The information processing method includes: sending, by a network device, a request message, where the request message includes the first frequency and the first PCI, the request message is used to request a cell global identifier of the first cell, and the first cell is a cell whose frequency is the first frequency and that is indicated by the first PCI; and receiving, by the network device, a response message returned for the request message, where when the first cell has no cell global identifier, the response message carries information about that the first cell has no cell global identifier, and a frequency, a second PCI, and a cell global identifier of a second cell associated with the first cell. It can be learned that, in this implementation, for a cell in which no system information is sent, the network device may receive a cell global identifier of another cell associated with the cell, to implement an automatic neighbor relation (ANR). That is, the network device may obtain cell-related information by using the cell global identifier of the another cell associated with the cell.

In an implementation, when the first cell has a cell global identifier, the response message carries the cell global identifier of the first cell and a synchronization channel center frequency of the first cell.

In an implementation, the method further includes: sending, by the network device based on the cell global identifier of the second cell or the cell global identifier of the first cell, a connection establishment request message to a target network device indicated by the cell global identifier of the second cell or the cell global identifier of the first cell; and receiving, by the network device, a connection establishment response message returned by the target network device, where the connection establishment response message includes at least one or more of a cell list including cells included by the target network device, a frequency, a physical cell identifier, and a cell global identifier of each cell in the cell list, and information about whether each cell in the cell list is a non-independent cell, and a cell in which no cell system information is sent and that is in the cell list. It can be learned that in this implementation, the network device may obtain information about a cell served by the network device by which the first cell is served, to facilitate subsequent cell camping, retransmission, link establishment, and the like.

According to still another aspect, this application further provides a measurement apparatus. The measurement apparatus may include a communications module, a processing module, and the like, and may further include another module configured to implement a related function of the communications apparatus in the foregoing aspects.

According to still another aspect, this application further provides a measurement apparatus. The measurement apparatus may include a communications module, a processing module, and the like, and may further include another module configured to implement a related function of the network device in the foregoing aspects.

According to still another aspect, this application further provides an information processing apparatus. The information processing apparatus may include a communications module, a processing module, and the like, and may further include another module configured to implement a related function of the communications apparatus in the foregoing aspects.

According to still another aspect, this application further provides an information processing apparatus. The information processing apparatus may include a communications module, a processing module, and the like, and may further include another module configured to implement a related function of the network device in the foregoing aspects.

According to still another aspect, this application further provides a communications device. The communications device implements a function of the communications apparatus and/or the network device in the foregoing methods. The function may be implemented by hardware, and for example, the communications device includes a processor and a communications interface. Alternatively, the function may be implemented by hardware by executing corresponding software. The hardware or the software includes one or more modules corresponding to the foregoing function, and the module may be software and/or hardware.

According to still another aspect, an embodiment of this application further provides a computer-readable storage medium. The readable storage medium stores the measurement method provided in any one of the foregoing aspects or program code of the measurement method provided in any one or more of the possible implementations of any one of the foregoing aspects, where the program code includes an executable instruction for running the measurement method provided in any one of the foregoing aspects or the measurement method provided in any one or more of the possible implementations of any one of the foregoing aspects.

According to still another aspect, an embodiment of this application further provides a computer program product including an instruction. When the computer program product runs on a computer, the computer is enabled to perform the methods in the foregoing aspects. All or a part of programs in the computer program product may be stored in a storage medium that is encapsulated together with a processor, or a part or all of programs may be stored in a memory that is not encapsulated together with a processor.

According to still another aspect, this application further provides a processor. The processor may include at least one circuit configured to perform a measurement evaluation based on configuration information or perform processing based on a request message. The processor further includes at least one circuit configured to receive the configuration information or receive the request message. The processor may be a chip. The processor may execute an instruction or a program configured to implement a function related to the communications apparatus.

According to still another aspect, an embodiment of this application further provides another processor. The processor may include at least one circuit configured to determine configuration information or determine a request message. The processor further includes at least one circuit configured to send the configuration information, send the request message, receive a response message, or the like. The processor may be a chip. The processor may execute an instruction or a program configured to implement a function related to the network device.

According to still another aspect, an embodiment of this application further provides a chip system. The chip system includes a processor, and is used by the communications apparatus and/or the network device to implement the functions in the foregoing aspects, for example, generating or processing data and/or information in the foregoing methods. In a possible design, the chip system further includes a memory. The memory is configured to store a program instruction and data that are necessary for implementing functions of the communications apparatus and/or the network device. The chip system may include a chip, or may include a chip and another discrete component.

DETAILED DESCRIPTION OF ILLUSTRATIVE EMBODIMENTS

Terms used in the embodiments of this application are merely used to explain specific embodiments of this application, but are not intended to limit this application.

Figure 1:
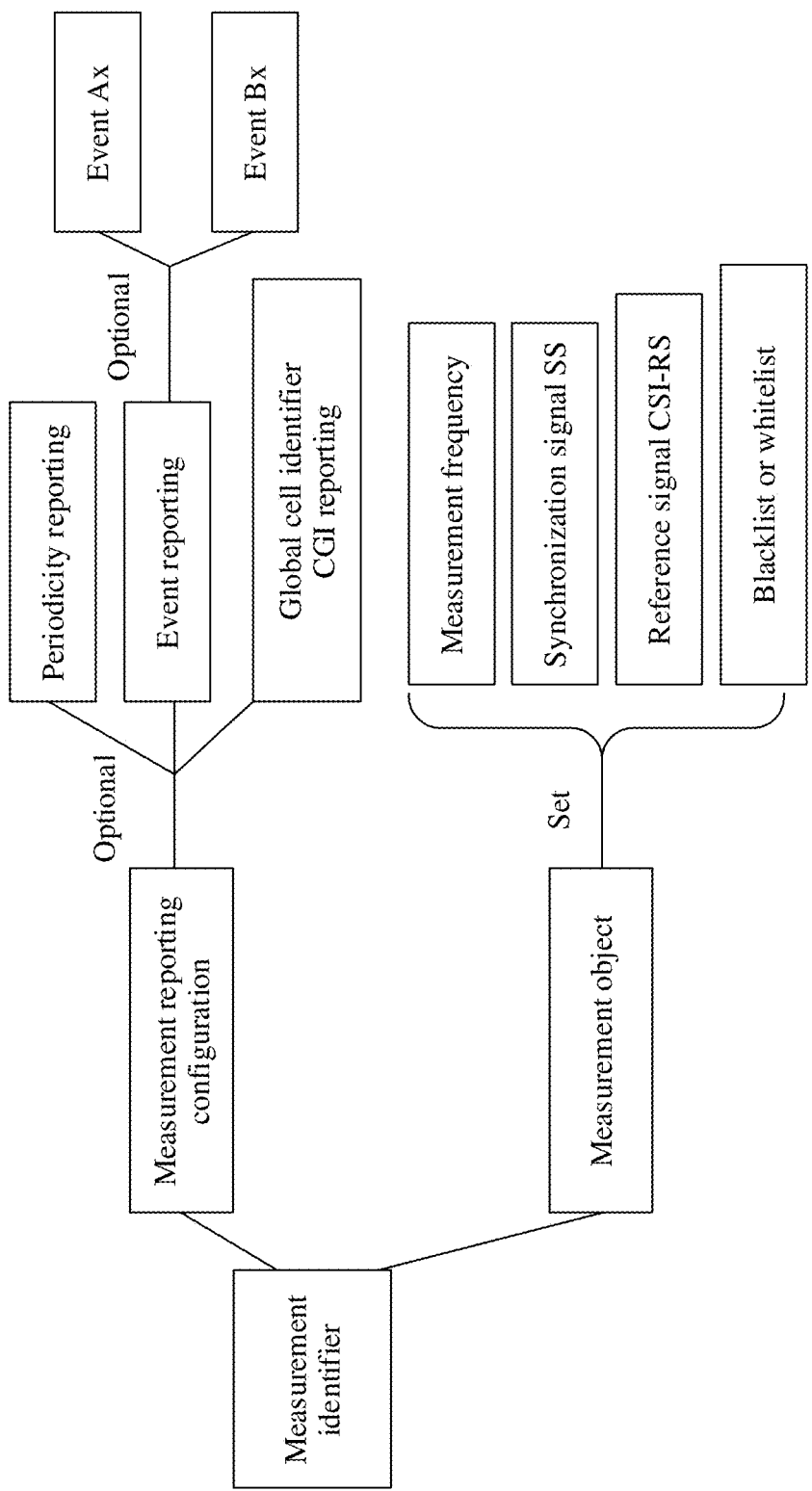
FIG. 1 is a schematic diagram of a measurement information configuration in the prior art.

To perform radio resource management, a network device needs to perform a related measurement and a trigger evaluation through a terminal. Therefore, the network device pre-sends configuration information to the terminal. The configuration information in this application may also be referred to as measurement configuration information or measurement information. This is not limited. As shown in FIG. 1, a blacklist or a whitelist configured for a measurement object is specific to the measurement object. To be specific, when a trigger evaluation is performed, a measurement result of a cell in the blacklist is considered for none of or a measurement result of a cell in the whitelist is considered for all measurement events associated with the measurement object. However, actually, some measurement events may be reported for the cell in the blacklist or may not be reported for the cell in the whitelist. Consequently, due to current configuration information, the terminal omits a cell for which a trigger evaluation needs to be performed, or the terminal performs an unnecessary trigger evaluation.

To resolve the foregoing problem, this application provides a measurement method. Configuration information can include a cell list and indication information, and whether a measurement event is affected by the cell list may be determined based on the indication information, to determine a measurement event, where a measurement result of a cell in the cell list may not be considered in a trigger evaluation for the measurement event, and a measurement event, where a measurement result of a cell in the cell list may be considered in a trigger evaluation for the measurement event. Compared with a whitelist or blacklist mechanism in the prior art, this can prevent the terminal from performing an unnecessary trigger evaluation, or prevent the terminal from omitting a cell for which a trigger evaluation needs to be performed.

Figure 2:
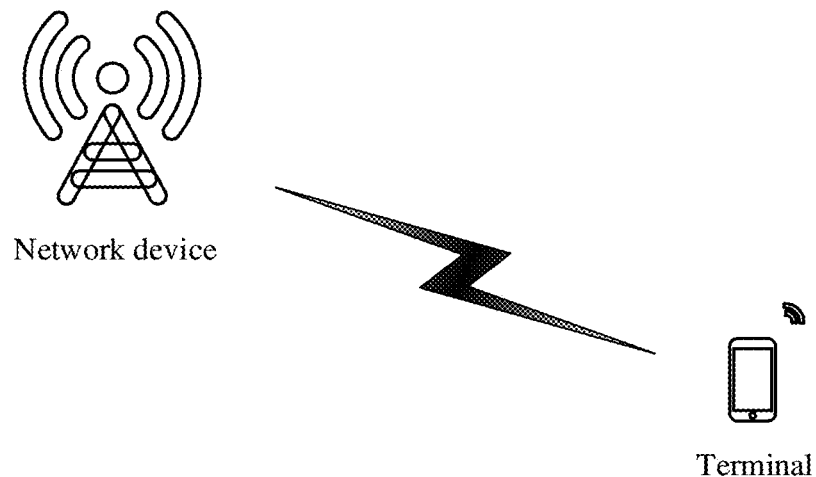
FIG. 2 is a schematic structural diagram of a communications system according to an embodiment of this application.

FIG. 2 shows an example application scenario according to an embodiment of this application. As shown in FIG. 2, a communications system may include at least one terminal and at least one network device. In FIG. 2, an example in which the terminal is a mobile phone and the network device is a base station is used. The base station may include a plurality of cells. Therefore, when the terminal obtains a measurement result based on a frequency, the measurement result may include measurement results of a plurality of cells.

In this embodiment of this application, the network device may alternatively be a transmission reception point (TRP), a radio remote unit (RRU), or another type of access point (AP). For example, the base station may refer to a device that communicates with the terminal through one or more sectors on an air interface in an access network, and may coordinate attribute management of the air interface. For example, the base station may be a base station in GSM or CDMA, for example, a base transceiver station (BTS); or may be a base station in WCDMA, for example, a NodeB; or may be an evolved base station in LTE, for example, an eNB or eNodeB (evolved NodeB); or may be a gNB in a 5G system, a base station in a future network, or the like. This is not limited in this application. Optionally, the base station may be a relay device, or another network element device having a base station function.

In the embodiments of this application, a communications apparatus may alternatively be a terminal or a wireless terminal. The wireless terminal may be a device that provides voice and/or data connectivity for a user, a handheld device having a wireless connection function, or another processing device connected to a wireless modem. The wireless terminal may communicate with one or more core networks through a radio access network (for example, a RAN, radio access network). For example, the communications apparatus may alternatively be user equipment. The user equipment may be a mobile terminal such as a mobile phone (or referred to as a "cellular" phone) or a computer having a mobile terminal; or may be a portable, pocket-sized, handheld, computer built-in, or in-vehicle mobile apparatus, for example, a personal communications service (PCS) phone, a cordless telephone set, a session initiation protocol (SIP) phone, a wireless local loop (WLL) station, or a personal digital assistant (PDA). The user equipment exchanges a voice and/or data with the radio access network. Optionally, the user equipment may also be referred to as a mobile station (MS), a mobile terminal, a subscriber unit (SU), a subscriber station (SS), a remote station (RS), an access point (AP), a remote terminal (RT), an access terminal (AT), a user terminal (UT), a user agent (UA), a terminal device (TD), or the like. This is not limited in this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

In the embodiments of this application, a non-independent cell is a cell in which no system information is sent or a cell in which only a part of system information is sent. Correspondingly, an independent cell is a cell in which all system information is sent, and the independent cell may also be referred to as a complete cell, a defined cell, or the like. A network device usually sends master information block (MIB) and/or system information block (SIBs) based on a synchronization signal block. The MIB carries most basic information, and the information relates to decoding of a physical downlink shared channel (PDSCH). The terminal can continue to decode data on the PDSCH by using a parameter in the MIB and obtain the SIB only after decoding the MIB. Therefore, based on different information carried in synchronization signal blocks (SSB), SSBs may be classified into three types of SSBs.

Specifically, a first type of SSB is an SSB carrying location information of a SIB 1. After obtaining the location information through a PBCH in the SSB, the terminal may read the SIB 1, and then obtain another SIB based on location information that is of the another SIB and that is in the SIB 1. Therefore, a cell associated with this type of SSB is the first type of cell: an independent cell, a defined cell, or the like. The second type of SSB is an SSB carrying the location information of the SIB 1. However, the SIB 1 does not carry location information of another SIB. In this case, the terminal can obtain only the SIB 1, but cannot obtain another SIB. The SIB 1 carries only a cell global identifier of a cell. Therefore, a cell associated with this type of SSB is the second type of cell. The second type of cell is a non-independent cell. To be specific, the second type of cell cannot work as a primary component carrier, but can work as a secondary component carrier. The third type of SSB does not carry the location information of the SIB 1, but carries location information of the first type of SSB or the second type of SSB. In other words, a PBCH of this type of SSB carries the location information of the first type of SSB or the second type of SSB. In this case, the terminal cannot obtain system information of a cell associated with the SSB. Therefore, the cell associated with this type of SSB is the third type of cell. The third type of cell is a non-independent cell. In other words, the third type of cell cannot work as a primary component carrier, but can work as a secondary component carrier.

The following describes the solutions in the embodiments of this application with reference to more accompanying drawings.

Figure 3:
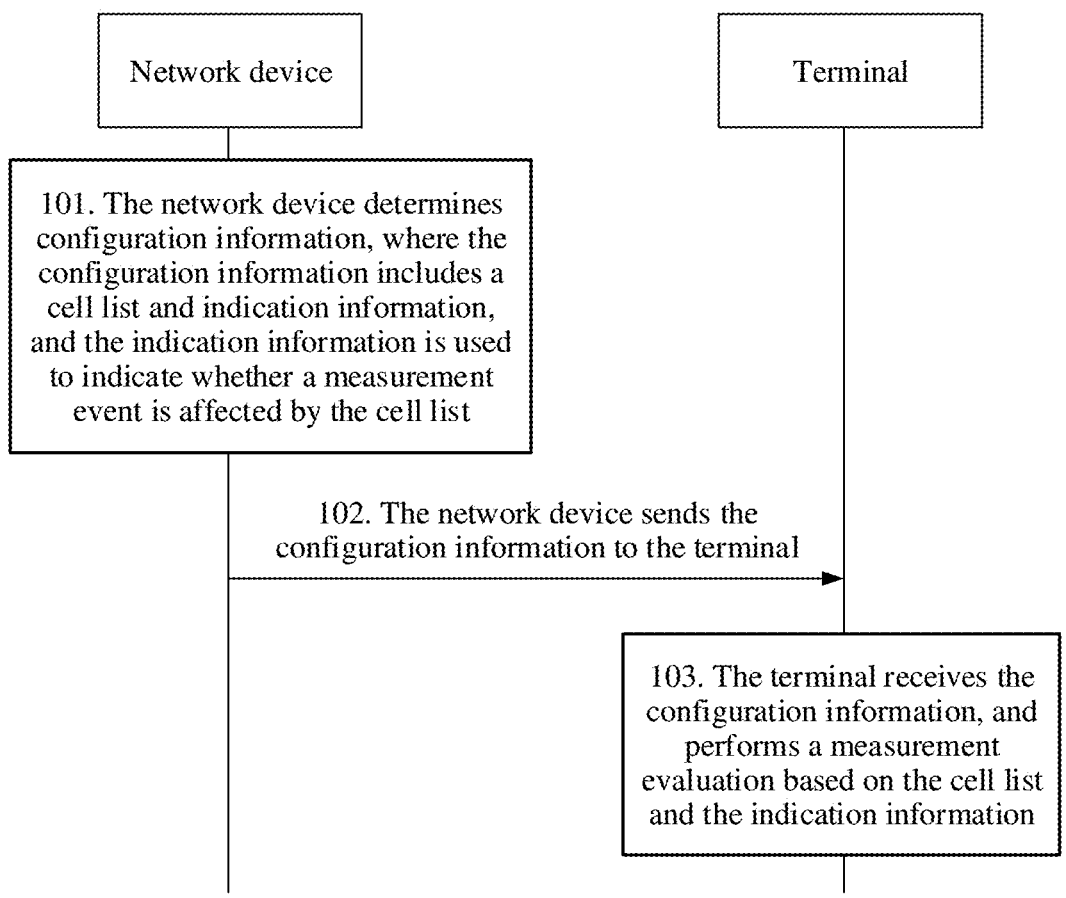
FIG. 3 is a schematic flowchart of a measurement method according to an embodiment of this application.

FIG. 3 is a schematic flowchart of a measurement method according to an embodiment of this application. As shown in FIG. 3, the measurement method may include the following steps:

101. A network device determines configuration information, where the configuration information includes a cell list and indication information, and the indication information is used to indicate whether a measurement event is affected by the cell list.

102. The network device sends the configuration information to a terminal.

103. The terminal receives the configuration information, and performs a measurement evaluation based on the cell list and the indication information.

The configuration information further includes a measurement object and measurement event configuration information, the measurement object is a measurement object that includes the cell list, and the measurement event configured in the measurement event configuration information is a measurement event associated with the measurement object. That is, for the measurement event associated with the measurement object, after a measurement is performed on the measurement object, it needs to be determined whether an obtained measurement result triggers the measurement event.

It can be learned that, in this embodiment of this application, the cell list is associated with the measurement event. That is, the cell list is an event level cell list. Compared with a current frequency level of a blacklist or a whitelist, flexibility between a trigger evaluation for the measurement event and cell selection can be improved, and it is unnecessary that all measurement events are completely restricted to a blacklist or a whitelist associated with a measurement object (namely, a frequency). In this way, it is avoided that a trigger evaluation is omitted for a cell, or an unnecessary trigger evaluation is performed for a cell.

For example, in an implementation, that the terminal performs a measurement evaluation based on the cell list and the indication information in 103 may include the following steps:

1031. The terminal determines, based on the indication information, whether the measurement event associated with the measurement object is affected by the cell list.

1032. The terminal measures the measurement object to obtain the measurement result.

1033. When the measurement event associated with the measurement object is affected by the cell list, the terminal excludes a measurement result of a cell in the cell list from the measurement result;

the terminal determines, based on the measurement result, whether the measurement event associated with the measurement object is triggered.

Correspondingly, 103 may further include the following step:

1034. When the measurement event associated with the measurement object is not affected by the cell list, the terminal determines, based on the measurement result, whether the measurement event associated with the measurement object is triggered.

In other words, when the measurement event associated with the measurement object is not affected by the cell list, the measurement result of the cell in the cell list does not need to be excluded from the measurement result.

In another implementation, the configuration information further includes a blacklist, and the blacklist is used to indicate that a measurement result of a cell in the blacklist is considered in trigger evaluations for none of measurement events associated with the measurement object. In this case, in step 1034, if the measurement event associated with the measurement object is not affected by the cell list, the measurement result of the cell in the blacklist needs to be excluded from the measurement result. In another possible implementation, the terminal may not obtain the measurement result of the cell in the blacklist when performing step 1032.

In this embodiment of this application, the cell list may also be referred to as a gray list relative to a current blacklist or whitelist.

In the embodiments of this application, a configuration method is further provided for the indication information, namely, a configuration method in which the indication information is included in the measurement event configuration information. When the measurement event configuration information includes the indication information, the measurement event associated with the measurement object is affected by the cell list; or when the measurement event configuration information does not include the indication information, the measurement event associated with the measurement object is not affected by the cell list.

Figure 4:
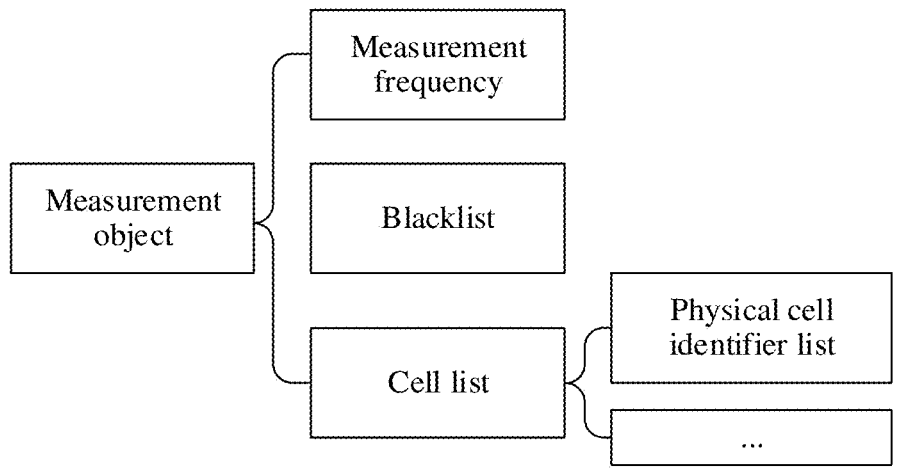
FIG. 4 is a schematic diagram of a measurement object according to an embodiment of this application.
Figure 5:
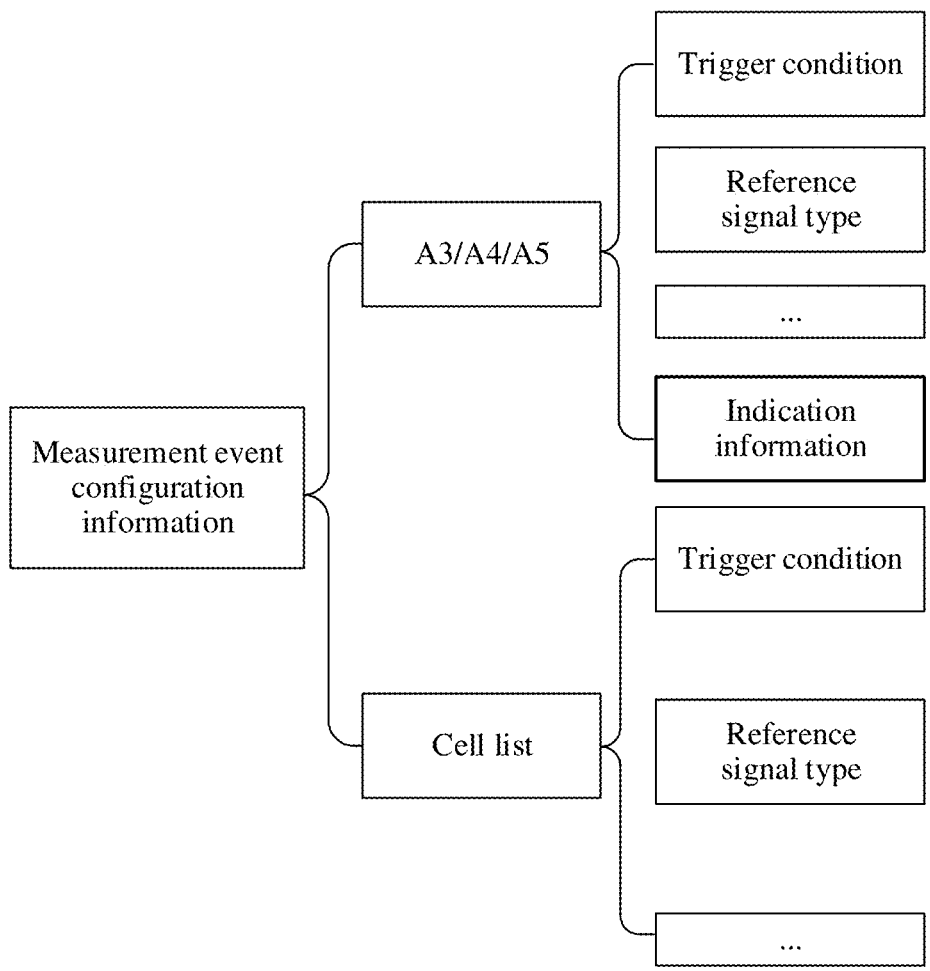
FIG. 5 is a schematic diagram of measurement event configuration information according to an embodiment of this application.

For example, FIG. 4 is a schematic diagram of a measurement object according to an embodiment of this application, and FIG. 5 is a schematic diagram of measurement event configuration information according to an embodiment of this application. As shown in FIG. 4, it is assumed that the measurement object may include a frequency, a blacklist, and a cell list, and the cell list includes a physical cell identifier of a cell. As shown in FIG. 5, a measurement event affected by a cell list in the measurement event configuration information, for example, A3/A4/A5, may include indication information. The indication information is used to indicate that the measurement event configured in the measurement event configuration information is affected by the cell list.

Correspondingly, that the terminal determines, based on the indication information, whether the measurement event associated with the measurement object is affected by the cell list in 1031 includes: when the measurement event configuration information includes the indication information, the terminal determines that the measurement event associated with the measurement object is affected by the cell list; or when the measurement event configuration information does not include the indication information, the terminal determines that the measurement event associated with the measurement object is not affected by the cell list.

In the embodiments of this application, another configuration method is further provided for the indication information, namely, a configuration method in which the indication information is configured in the measurement object.

Figure 6:
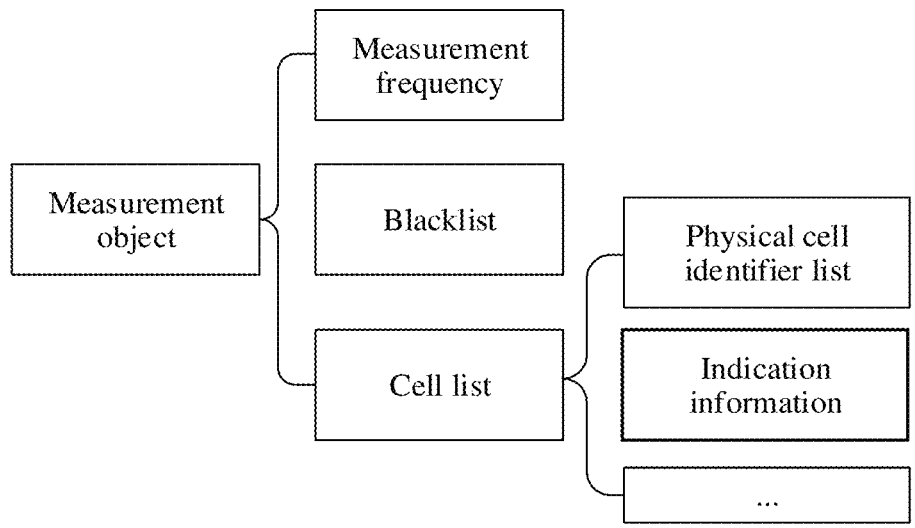
FIG. 6 is a schematic diagram of another measurement object according to an embodiment of this application.

For example, FIG. 6 is a schematic diagram of another measurement object according to an embodiment of this application. As shown in FIG. 6, it is assumed that the measurement object may include a frequency, a blacklist, and a cell list, and the cell list includes a physical cell identifier of a cell. The cell list may further include indication information, and the indication information may be a measurement event type indication. When the measurement event associated with the measurement object is of a type indicated by the indication information, the measurement event associated with the measurement object is affected by the cell list; or when the measurement event associated with the measurement object is not of a type indicated by the indication information, the measurement event associated with the measurement object is not affected by the cell list.

Correspondingly, that the terminal determines, based on the indication information, whether the measurement event associated with the measurement object is affected by the cell list in 1031 includes: when the measurement event associated with the measurement object is of the type indicated by the indication information, the terminal determines that the measurement event associated with the measurement object is affected by the cell list; or when the measurement event associated with the measurement object is not of a type indicated by the indication information, the terminal determines that the measurement event associated with the measurement object is not affected by the cell list.

It can be learned from the foregoing that, the non-independent cell is a cell in which no system information is sent or a cell in which only a part of system information is sent, and can work only as a secondary component carrier, but cannot work as a primary component carrier. Therefore, a measurement result of such a cell does not need to be considered in a trigger evaluation for a measurement event used for primary component carrier switching. Therefore, the non-independent cell may be set in the cell list, so that a measurement result of a cell in the cell list may not be considered in a trigger evaluation for a measurement event used for the primary component carrier switching; and a measurement result of a cell in the cell list may be considered in a trigger evaluation for a measurement event used for secondary component carrier switching. In this way, a waste of terminal processing resources caused by an unnecessary evaluation in a whitelist mechanism is avoided.

In an implementation, if the cell in the cell list is a non-independent cell, after learning of the cell list, the terminal may alternatively not select the cell in the cell list when performing connection re-establishment or restoration. In other words, if the cell in the cell list is the non-independent cell, the cell in the cell list is not used as a cell selected by the terminal when the terminal performs connection re-establishment or restoration.

In an implementation, after performing step 103, the terminal may alternatively not report the cell in the cell list in measurement reporting when the measurement event associated with the measurement object is triggered. This further reduces signaling overheads required for the measurement reporting.

Figure 7:
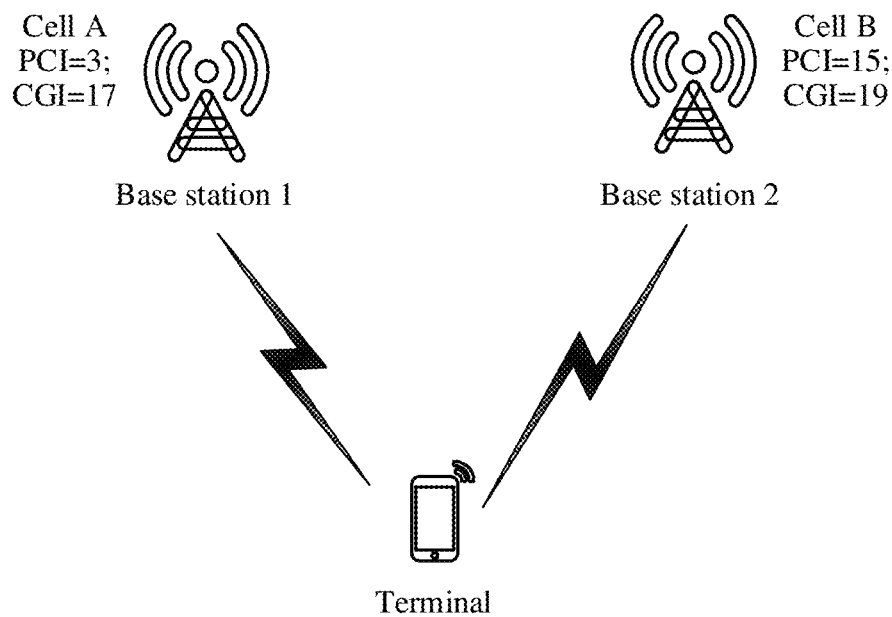
FIG. 7 is a schematic diagram of an automatic neighbor relation in the prior art.

It can be learned from the foregoing that, for the third type of cell associated with the third type of SSB, the network device does not send system information in this type of cell, and the terminal cannot learn of a cell global identifier of this type of cell. However, FIG. 7 is a schematic diagram of an automatic neighbor relation in the prior art. As shown in FIG. 7, a terminal sends a detected physical cell identifier PCI of a cell B to a base station 1 serving a cell A, where the PCI is 15. If determining that the PCI of 15 of the cell B sent by the terminal cannot be identified, the base station 1 indicates the terminal to obtain and report a cell global identifier corresponding to the PCI of 15. The terminal obtains location information of a SIB 1 of the cell B by reading content carried on a broadcast channel of the cell B, and then obtains content of the SIB 1 based on the location information, to obtain the cell global identifier 19 corresponding to the PCI of 15. The terminal may report the cell global identifier 19 corresponding to the PCI of 15 to the base station 1, so that the base station 1 learns of a correspondence between the PCI of 15 and the CGI of 19. It can be learned that, in the automatic neighbor relation, when the cell B detected by the terminal is the foregoing third type of cell, how to perform processing is an urgent problem to be resolved.

To resolve this problem, an embodiment of this application further provides an information processing method. According to the information processing method, a terminal obtains a cell global identifier of another cell based on location information carried on a broadcast channel of a cell B, and reports the cell global identifier. In this way, the base station 1 learns of the cell global identifier of the another cell associated with a physical cell identifier of the cell B, to complete another operation of the automatic neighbor relation.

Figure 8:
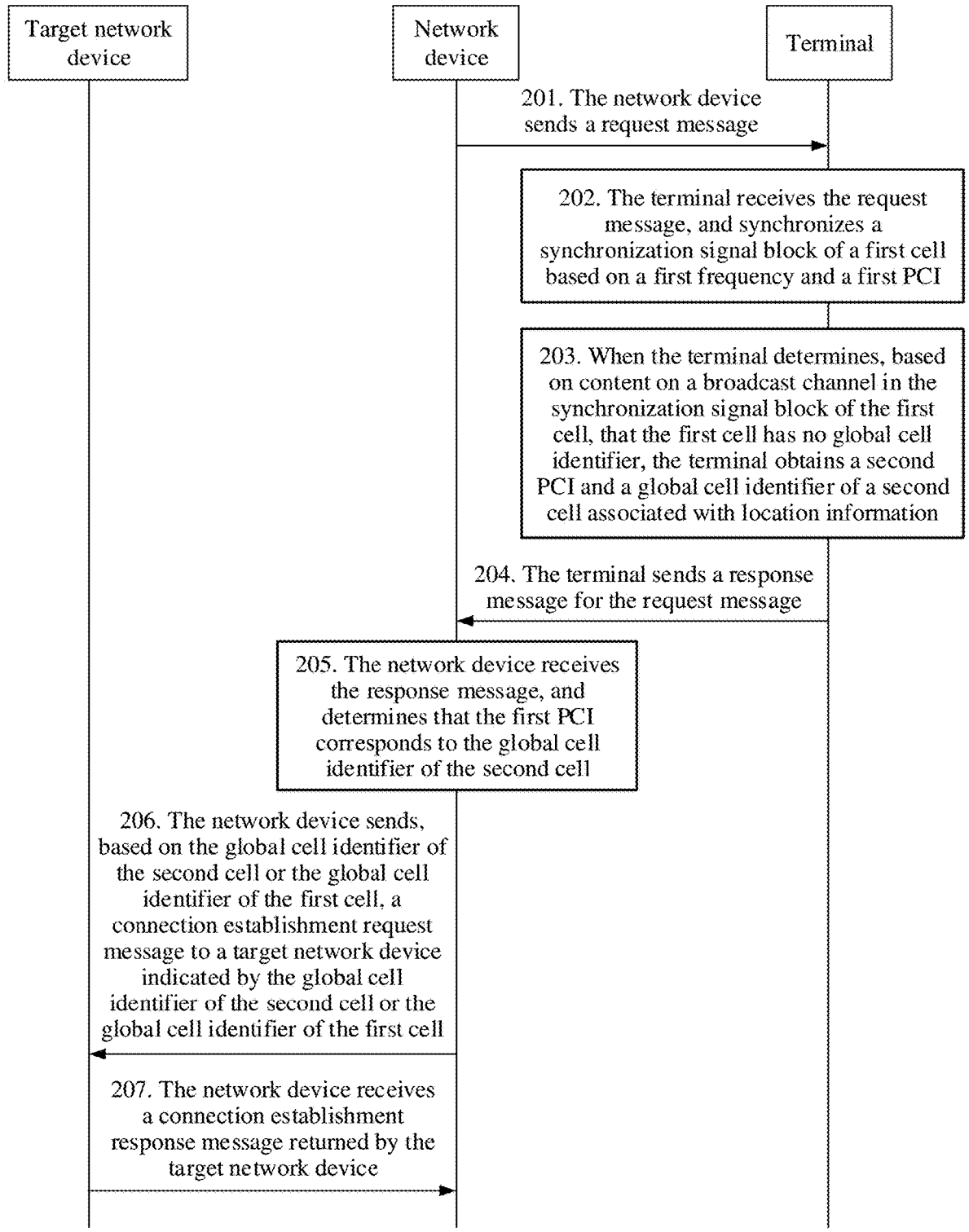
FIG. 8 is a schematic flowchart of an information processing method according to an embodiment of this application.

Specifically, FIG. 8 is a schematic flowchart of an information processing method according to an embodiment of this application. As shown in FIG. 8, the information processing method may include the following steps.

201. A network device sends a request message, where the request message includes a first frequency and a first physical cell identifier (PCI), the request message is used to request a cell global identifier of a first cell, and the first cell is a cell whose frequency is the first frequency and that is indicated by the first PCI.

In an example, if the network device determines that a cell global identifier of the physical cell identifier (PCI) corresponding to the first frequency cannot be determined, the network device requests the terminal to perform reporting, that is, sends the request message.

202. A terminal receives the request message, and synchronizes a synchronization signal block of the first cell based on the first frequency and the first PCI.

203. When the terminal determines, based on content on a broadcast channel in the synchronization signal block of the first cell, that the first cell has no cell global identifier, the terminal obtains a second PCI and a cell global identifier of a second cell associated with location information.

The location information is carried on the broadcast channel in the synchronization signal block of the first cell, and the second cell associated with the location information is a cell in which a cell global identifier is sent.

204. The terminal sends a response message for the request message, where the response message carries information about that the first cell has no cell global identifier, and a frequency, the second PCI, and the cell global identifier of the second cell.

205. The network device receives the response message, and determines that the first PCI corresponds to the cell global identifier of the second cell.

In an implementation, the network device may further perform the following steps:

206. The network device sends, based on the cell global identifier of the second cell or the cell global identifier of the first cell, a connection establishment request message to a target network device indicated by the cell global identifier of the second cell or the cell global identifier of the first cell.

207. The network device receives a connection establishment response message returned by the target network device, where the connection establishment response message includes at least one or more of a cell list including cells included by the target network device, a frequency, a physical cell identifier, and a cell global identifier of each cell in the cell list, information about whether each cell in the cell list is a non-independent cell, and a cell in which no system information is sent and that is in the cell list.

It can be learned that in this implementation, the network device may obtain information about a cell served by the network device by which the first cell is served, to facilitate subsequent cell camping, retransmission, link establishment, and the like.

That the terminal obtains a second PCI and a cell global identifier of a second cell associated with location information in 203 may include: the terminal synchronizes a target synchronization signal block based on the location information, where the target synchronization signal block is a synchronization signal block on a frequency indicated by the location information; the terminal determines, based on content on a broadcast channel in the target synchronization signal block, a SIB 1 of the second cell on the frequency indicated by the location information; and the terminal obtains a cell global identifier carried in the SIB 1.

In an implementation, this application further provides an information processing method. When a first cell has a cell global identifier, in a process of obtaining the cell global identifier of the first cell, the terminal may further perform the following steps:

when determining, based on the content on the broadcast channel in the synchronization signal block of the first cell, that the first cell has the cell global identifier, reading, by the terminal, first system information SIB 1 based on the content on the broadcast channel in the synchronization signal block of the first cell;

obtaining, by the terminal based on the SIB 1, a frequency that corresponds to a frequency offset and that is in the SIB 1 and the cell global identifier of the first cell; and when the frequency corresponding to the frequency offset is different from the first frequency, sending, by the terminal, a response message for the request message, where the response message carries the frequency corresponding to the frequency offset and the cell global identifier of the first cell, and the frequency corresponding to the frequency offset is used as a synchronization channel center frequency of the first cell.

Figure 9:
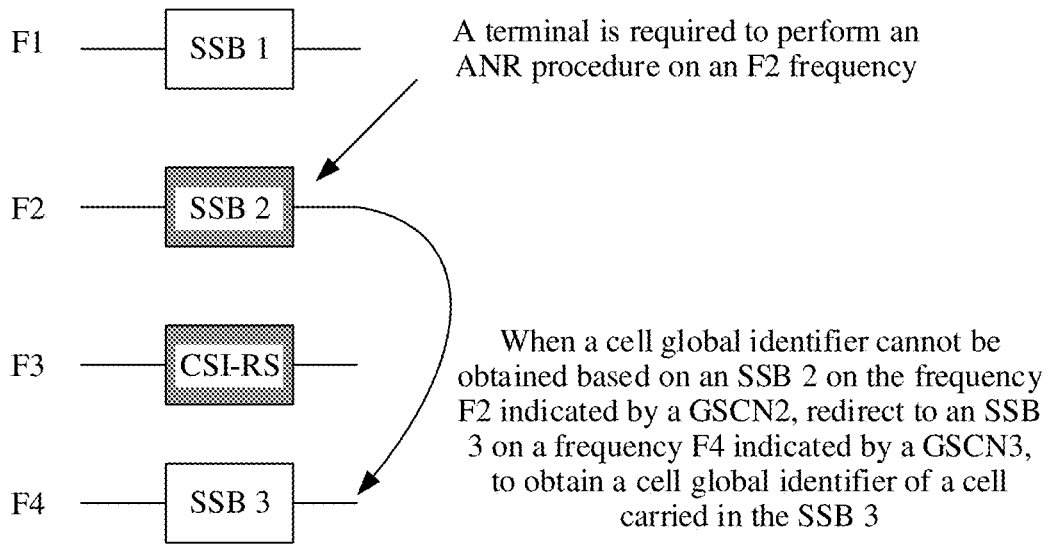
FIG. 9 is a schematic diagram of distribution of synchronization signal blocks according to an embodiment of this application.

FIG. 9 is a schematic diagram of distribution of synchronization signal blocks according to an embodiment of this application. As shown in FIG. 9, synchronization signal blocks indicated by global synchronization channel numbers (GSCN) are distributed in a comb manner. Based on the information processing method provided in the embodiments of this application, in an ANR process, when a cell global identifier of a cell cannot be obtained based on a synchronization signal block of a GSCN2 of a frequency F2, the terminal may synchronize a synchronization signal block of a GSCN3 of a frequency F4 based on location information carried on a broadcast channel in the synchronization signal block of the GSCN2, and obtain the cell global identifier based on the synchronization signal block of the GSCN3.

As shown in FIG. 9, GSCNs of frequencies on which synchronization channel reading is performed are distributed in a comb manner. Every three GSCNs form into a group, and a spacing between every two groups is 900 kHz.

However, a spacing between three GSCNs that are in one group and distributed in a comb manner is very narrow, and is only 5 kHz. However, a synchronization channel has a bandwidth of 3600 kHz. In this way, even if a terminal is not aligned with a GSCN used by a network, the terminal may still receive a related synchronization signal block. For example, even if the network actually sends a synchronization signal at the GSCN1, the terminal may still find the synchronization signal by searching for the synchronization signal on the frequency corresponding to the GSCN2. However, the terminal does not know that the network actually sends the synchronization signal block at the GSCN1. To solve this problem, frequency offset information is added to broadcast in the network. After finding a synchronization channel, the terminal reads a broadcast channel corresponding to the synchronization channel. If the broadcast channel indicates an offset value, the terminal determines an actual center frequency location of the synchronization channel of a current cell based on the offset value. For example, when a synchronization signal is sent at the GSCN1 in the network, an offset of −5 kHz needs to be broadcast in the broadcast. The terminal may find the signal no matter whether the terminal searches for the synchronization signal at the GSCN1, the GSCN2, or the GSCN3. Then, after reading a broadcast signal associated with the synchronization signal, the UE determines that an actual location of the synchronization signal is a location of −5 kHz and determines a location of the GSCN1. In this case, the terminal may determine an actual location of the synchronization channel of the cell based on the frequency offset information. Therefore, in the foregoing implementation, the terminal may determine the actual location of the synchronization channel.

At least one or more of the foregoing possible implementations provided in the embodiments of this application may be used to perform a measurement or perform information processing. This is not limited in the embodiments of this application. In some examples, in the embodiments of this application, the foregoing possible implementations may be further combined with an existing measurement method for implementation. This is not limited in the embodiments of this application. For example, both a blacklist and a cell list may be configured in a measurement object, and the terminal may implement a measurement evaluation and reporting by combining related operations on the cell list with an existing blacklist mechanism.

Figure 10:
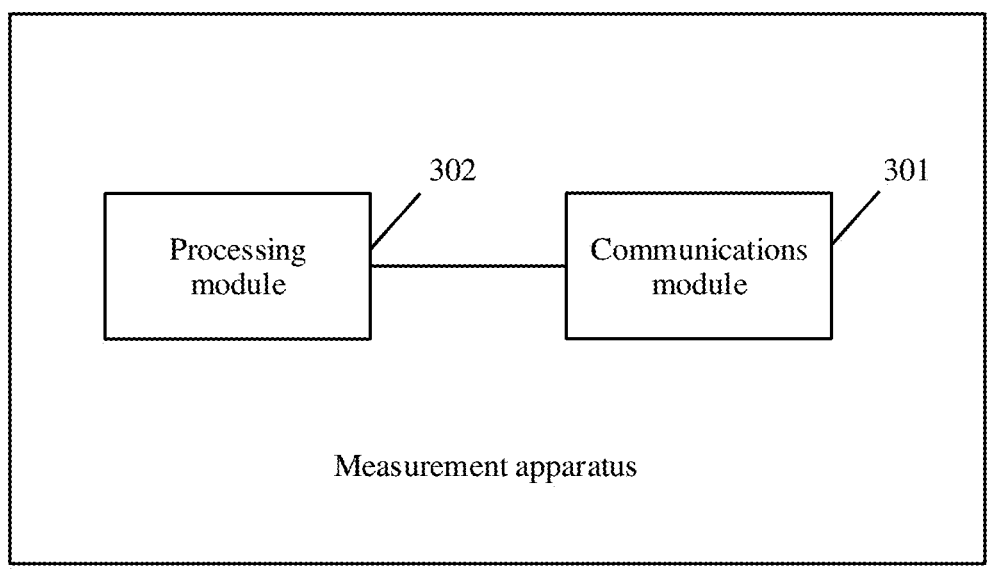
FIG. 10 is a schematic structural diagram of a measurement apparatus according to an embodiment of this application.

FIG. 10 is a schematic structural diagram of a measurement apparatus according to an embodiment of this application. The communications apparatus may include a communications module and a processing module.

The communications module 301 is configured to receive configuration information, where the configuration information includes a cell list and indication information, and the indication information is used to indicate whether a measurement event is affected by the cell list.

The processing module 302 is configured to perform a measurement evaluation based on the cell list and the indication information.

The configuration information further includes a measurement object and measurement event configuration information, the measurement object is a measurement object that includes the cell list, and the measurement event configured in the measurement event configuration information is a measurement event associated with the measurement object.

In an implementation, performing, by the processing module, the measurement evaluation based on the cell list and the indication information is specifically:

determining, based on the indication information, whether the measurement event associated with the measurement object is affected by the cell list;

measuring the measurement object when the measurement event associated with the measurement object is affected by the cell list, to obtain a measurement result, and excluding a measurement result of a cell in the cell list from the measurement result; and determining, based on the measurement result, whether the measurement event associated with the measurement object is triggered.

In an implementation, the communications module 301 is further configured to skip reporting the cell in the cell list in measurement reporting when the measurement event associated with the measurement object is triggered.

In an implementation, the indication information is included in the measurement event configuration information, and the determining, by the communications module 302 based on the indication information, whether the measurement event associated with the measurement object is affected by the cell list is specifically:

when the measurement event configuration information includes the indication information, determining that the measurement event associated with the measurement object is affected by the cell list; or when the measurement event configuration information does not include the indication information, determining that the measurement event associated with the measurement object is not affected by the cell list.

In an implementation, the indication information is configured in the measurement object, and determining, by the communications module 302 based on the indication information, whether the measurement event associated with the measurement object is affected by the cell list is specifically:

when the measurement event associated with the measurement object is of a type indicated by the indication information, determining that the measurement event associated with the measurement object is affected by the cell list; or when the measurement event associated with the measurement object is not of a type indicated by the indication information, determining that the measurement event associated with the measurement object is not affected by the cell list.

In an implementation, a cell in the cell list is a non-independent cell, and the non-independent cell is a cell in which no system information is sent or a cell in which only a part of system information is sent.

In an implementation, the cell in the cell list is not used as a cell selected by the terminal when the terminal performs connection re-establishment or restoration.

In an implementation, the communications module 301 is further configured to receive a request message, where the request message includes a first frequency and a first physical cell identifier (PCI), the request message is used to request a cell global identifier of a first cell, and the first cell is a cell whose frequency is the first frequency and that is indicated by the first PCI.

The processing module 302 is further configured to synchronize a synchronization signal block of the first cell based on the first frequency and the first PCI.

The processing module 302 is further configured to: when determining, based on content on a broadcast channel in the synchronization signal block of the first cell, that the first cell has no cell global identifier, obtain, by the terminal, a second PCI and a cell global identifier of a second cell associated with location information, where the location information is carried in the broadcast channel in the synchronization signal block of the first cell, and the second cell associated with the location information is a cell in which a cell global identifier is sent.

The communications module 301 is further configured to send a response message for the request message, where the response message carries information about that the first cell has no cell global identifier, and a frequency, the second PCI, and the cell global identifier of the second cell.

Figure 11:
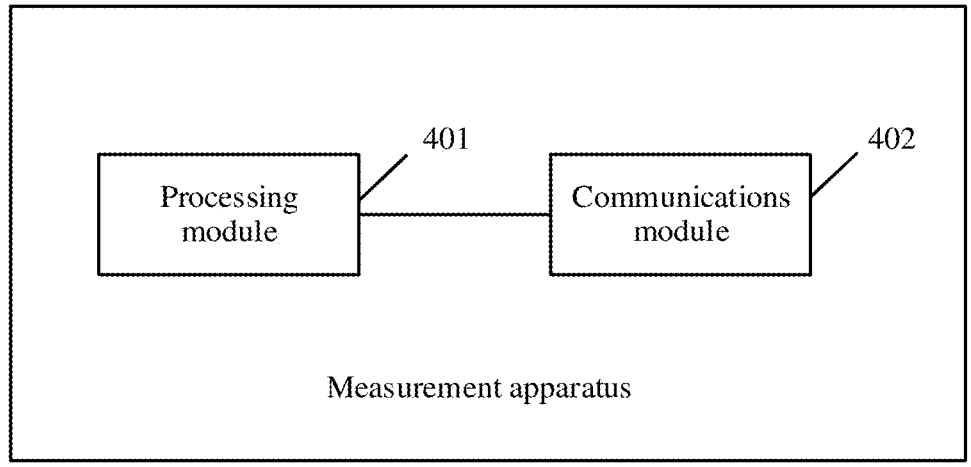
FIG. 11 is a schematic structural diagram of another measurement apparatus according to an embodiment of this application.

FIG. 11 is a schematic structural diagram of another measurement apparatus according to an embodiment of this application. The measurement apparatus may further include a processing module and a communications module.

The processing module 401 is configured to determine configuration information, where the configuration information includes a cell list and indication information, and the indication information is used to indicate whether a measurement event is affected by the cell list.

The communications module 402 is configured to send the configuration information to a terminal, where the configuration information is used for a measurement evaluation, so that the terminal performs the measurement evaluation based on the cell list and the indication information.

In an implementation, the configuration information further includes a measurement object and measurement event configuration information, the measurement object is a measurement object that includes the cell list, and the measurement event configured in the measurement event configuration information is a measurement event associated with the measurement object.

In an implementation, the indication information is included in the measurement event configuration information, and when the measurement event configuration information includes the indication information, the measurement event associated with the measurement object is affected by the cell list; or when the measurement event configuration information does not include the indication information, the measurement event associated with the measurement object is not affected by the cell list.

In an implementation, the indication information is configured in the measurement object, and when the measurement event associated with the measurement object is of a type indicated by the indication information, the measurement event associated with the measurement object is affected by the cell list; or when the measurement event associated with the measurement object is not of a type indicated by the indication information, the measurement event associated with the measurement object is not affected by the cell list.

In an implementation, a cell in the cell list is a non-independent cell, and the non-independent cell is a cell in which no system information is sent or a cell in which only a part of system information is sent.

In an implementation, the cell in the cell list is not used as a cell selected by the terminal when the terminal performs connection re-establishment or restoration.

In an implementation, the processing module 401 is further configured to determine a first physical cell identifier PCI and a first frequency of a first cell identified by the first PCI, where the first PCI and the first frequency cannot be identified.

The communications module 402 is further configured to send a request message, where the request message includes the first frequency and the first PCI, the request message is used to request a cell global identifier of the first cell, and the first cell is a cell whose frequency is the first frequency and that is indicated by the first PCI.

The communications module 402 is further configured to receive a response message returned for the request message, where when the first cell has no cell global identifier, the response message carries information about that the first cell has no cell global identifier, and a frequency, a second PCI, and a cell global identifier of a second cell associated with the first cell.

Figure 12:
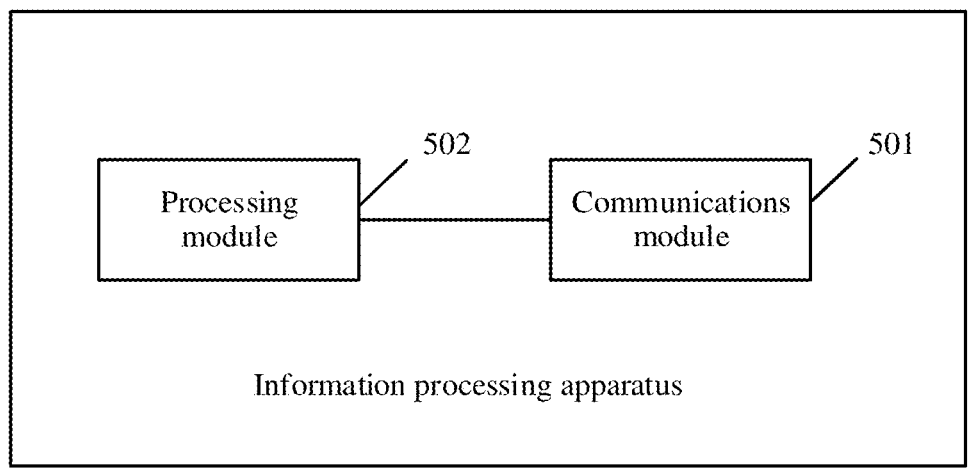
FIG. 12 is a schematic structural diagram of an information processing apparatus according to an embodiment of this application.

FIG. 12 is a schematic structural diagram of an information processing apparatus according to an embodiment of this application. As shown in FIG. 12, the information processing apparatus may include a communications module 501 and a processing module 502.

The communications module 501 is configured to receive a request message, where the request message includes a first frequency and a first physical cell identifier PCI, the request message is used to request a cell global identifier of a first cell, and the first cell is a cell whose frequency is the first frequency and that is indicated by the first PCI.

The processing module 502 is configured to synchronize a synchronization signal block of the first cell based on the first frequency and the first PCI.

The processing module 502 is further configured to: when determining, based on content on a broadcast channel in the synchronization signal block of the first cell, that the first cell has no cell global identifier, obtain, by a terminal, a second PCI and a cell global identifier of a second cell associated with location information, where the location information is carried in the broadcast channel in the synchronization signal block of the first cell, and the second cell associated with the location information is a cell in which a cell global identifier is sent.

The communications module 501 is further configured to send a response message for the request message, where the response message carries information about that the first cell has no cell global identifier, and a frequency, the second PCI, and the cell global identifier of the second cell.

In an implementation, in the information processing apparatus shown in FIG. 12, the processing module 502 is further configured to: when determining, based on the content on the broadcast channel in the synchronization signal block of the first cell, that the first cell has the cell global identifier, read first system information SIB 1 based on the content on the broadcast channel in the synchronization channel block of the first cell; and obtain, based on the first system message block SIB 1, a frequency that corresponds to a frequency offset and that is in the SIB 1 and the cell global identifier of the first cell; and the communications module 501 is further configured to: when the frequency corresponding to the frequency offset is different from the first frequency, send a response message for the request message, where the response message carries the frequency corresponding to the frequency offset and the cell global identifier of the first cell, and the frequency corresponding to the frequency offset is used as a synchronization channel center frequency of the first cell.

An embodiment of this application further provides an information processing apparatus. The information processing apparatus may include a communications module.

The communications module may be configured to send a request message, where the request message includes the first frequency and the first PCI, the request message is used to request a cell global identifier of the first cell, and the first cell is a cell whose frequency is the first frequency and that is indicated by the first PCI.

The communications module may be further configured to receive a response message returned for the request message, where when the first cell has no cell global identifier, the response message carries information about that the first cell has no cell global identifier, and a frequency, a second PCI, and a cell global identifier of a second cell associated with the first cell.

In an implementation, when the first cell has a cell global identifier, the response message carries the cell global identifier of the first cell and a synchronization channel center frequency of the first cell.

In an implementation, the communications module is further configured to send, based on the cell global identifier of the second cell or the cell global identifier of the first cell, a connection establishment request message to a target network device indicated by the cell global identifier of the second cell or the cell global identifier of the first cell; and receive a connection establishment response message returned by the target network device, where the connection establishment response message includes at least one or more of a cell list including cells included by the target network device, a frequency, a physical cell identifier, and a cell global identifier of each cell in the cell list, and information about whether each cell in the cell list is a non-independent cell, and a cell that has no cell global identifier and that is in the cell list.

For concepts, explanations, detailed descriptions, and other steps of the apparatus that are related to the technical solutions provided in the embodiments of this application, refer to the descriptions of the content in the foregoing methods. Details are not described herein again.

Figure 13:
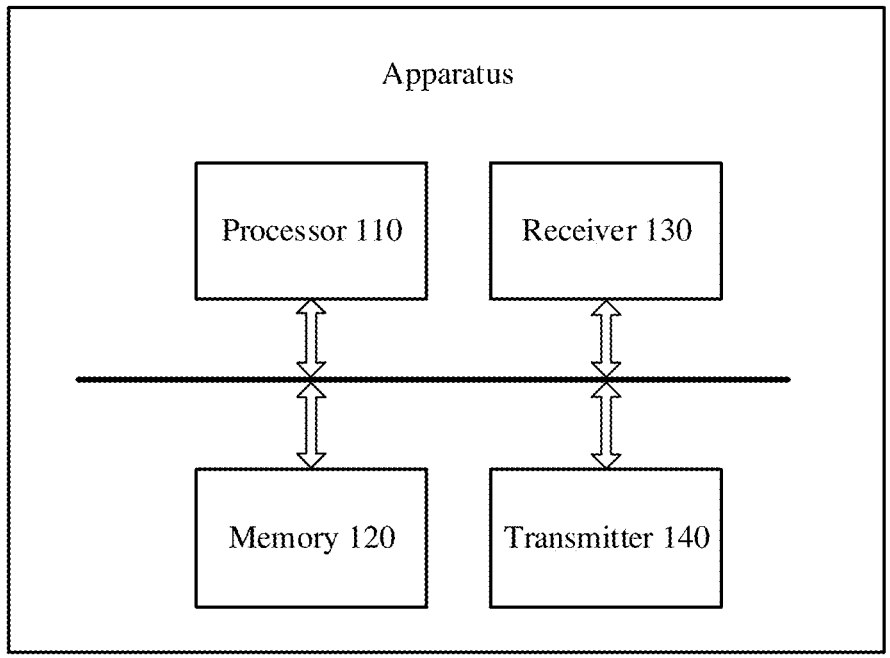
FIG. 13 is a schematic structural diagram of an apparatus according to an embodiment of this application.

FIG. 13 is a schematic structural diagram of an apparatus according to an embodiment of this application. As shown in FIG. 13, the apparatus may be a terminal or a network device, or may be a chip or a circuit, for example, a chip or a circuit that may be disposed in a base station controller. The apparatus may correspond to the terminal or the network device in the foregoing methods. The apparatus may include a processor 110 and a memory 120. The memory 120 is configured to store an instruction. The processor 110 is configured to execute the instruction stored in the memory 120, to implement the steps of the terminal or the network device in the measurement method or the information processing method corresponding to FIG. 3 to FIG. 8.

Further, the apparatus may further include a receiver 130 and a transmitter 140. The receiver 130 and the transmitter 140 may be configured to support communication between the terminal and the network device, and may perform a communication or interaction process of the terminal or the network device in the foregoing methods and/or another process used for the technology described in this application.

The processor 110 is configured to execute the instruction stored in the memory 120, to control the receiver 130 to receive a signal and control the transmitter 140 to send a signal, to complete the steps of the terminal or the network device in the foregoing methods. The receiver 130 and the transmitter 140 may be a same physical entity or different physical entities. If being the same physical entity, the receiver 130 and the transmitter 140 may be collectively referred to as a transceiver. The memory 120 may be integrated into the processor 110, or may be disposed separately from the processor 110.

For example, when the apparatus is configured to implement a function of the network device, the processor 110 may be configured to determine configuration information, the transmitter 140 may be configured to send the configuration information, and the memory 120 may include an instruction sufficient to allow the processor 110 to determine the configuration information, and may further include an instruction sufficient to allow the processor 110 to schedule the transmitter 140 to send the configuration information.

For another example, the apparatus is configured to implement a function of the terminal. The processor 110 may be configured to perform a measurement evaluation based on a cell list and indication information. The receiver 130 may be configured to receive configuration information. The memory 120 may include an instruction sufficient to allow the processor 110 to perform the measurement evaluation based on the cell list and the indication information, and may further include an instruction sufficient to allow the processor to receive the configuration information.

In an implementation, functions of the receiver 130 and the transmitter 140 may be considered to be implemented by using a transceiver circuit or a dedicated transceiver chip. The processor 110 may be considered to be implemented by using a dedicated processing chip, a processing circuit, a processor, or a general-purpose chip.

In another implementation, the terminal provided in this embodiment of this application, for example, the mobile phone in FIG. 2, may be considered to be implemented by using a general-purpose computer. To be specific, program code for implementing the functions of the processor no, the receiver 130, and the transmitter 140 is stored in a memory, and a general purpose processor implements the functions of the processor no, the receiver 130, and the transmitter 140 by executing the code stored in the memory.

It may be understood that FIG. 13 shows only a simplified design of the apparatus. During actual application, the apparatus may include any quantity of transceivers, processors, memories, and the like, and all apparatuses that can implement the technical solutions in the embodiments of this application fall within the protection scope of this application.

For concepts, explanations, detailed descriptions, and other steps of the apparatus that are related to the technical solutions provided in the embodiments of this application, refer to the descriptions of the content in the foregoing methods or other embodiments. Details are not described herein again.

Alternatively, the apparatus may be configured as a universal processing system, and for example, the apparatus may be generally referred to as a chip. The universal processing system includes one or more microprocessors that provide a processor function and an external memory that provides at least a part of a storage medium.

Figure 14:
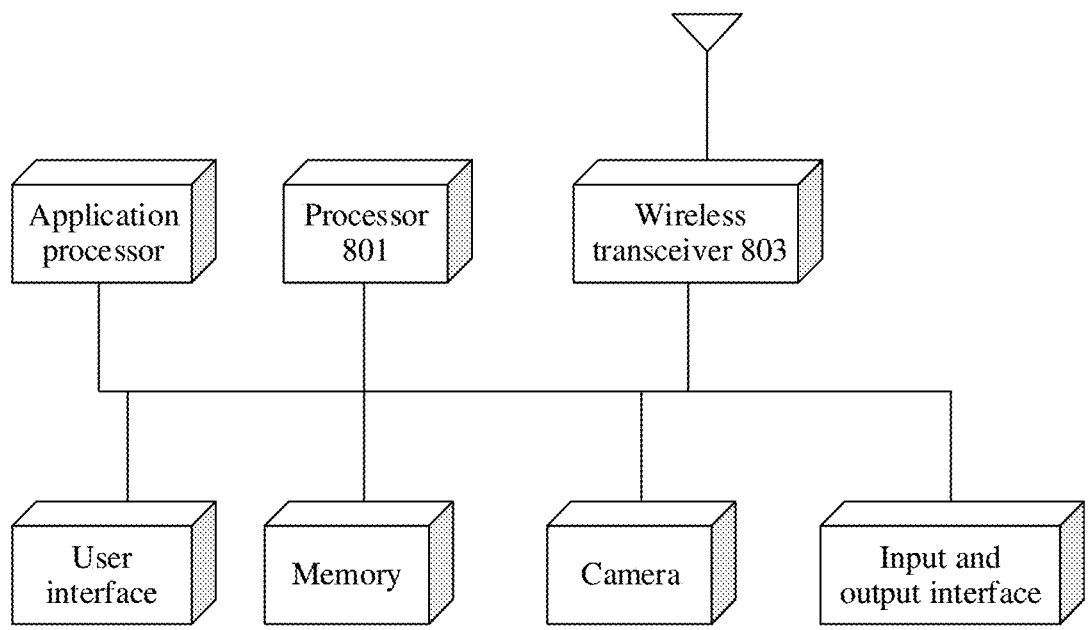
FIG. 14 is a schematic structural diagram of a device according to an embodiment of this application.

For the communications apparatus or the terminal in the embodiments of this application, refer to a device shown in FIG. 14. The device includes a processor 801, an application processor, a memory user interface, and some other elements (including a device such as a power supply that is not shown). In FIG. 14, the processing unit may be the processor 801, and completes a corresponding function. The sending unit and/or the receiving unit may be a radio transceiver 803 in the figure, and the radio transceiver 803 implements a corresponding function through an antenna. It may be understood that the elements shown in the figure are merely an example, and are not mandatory elements for implementing the embodiments.

Figure 15:
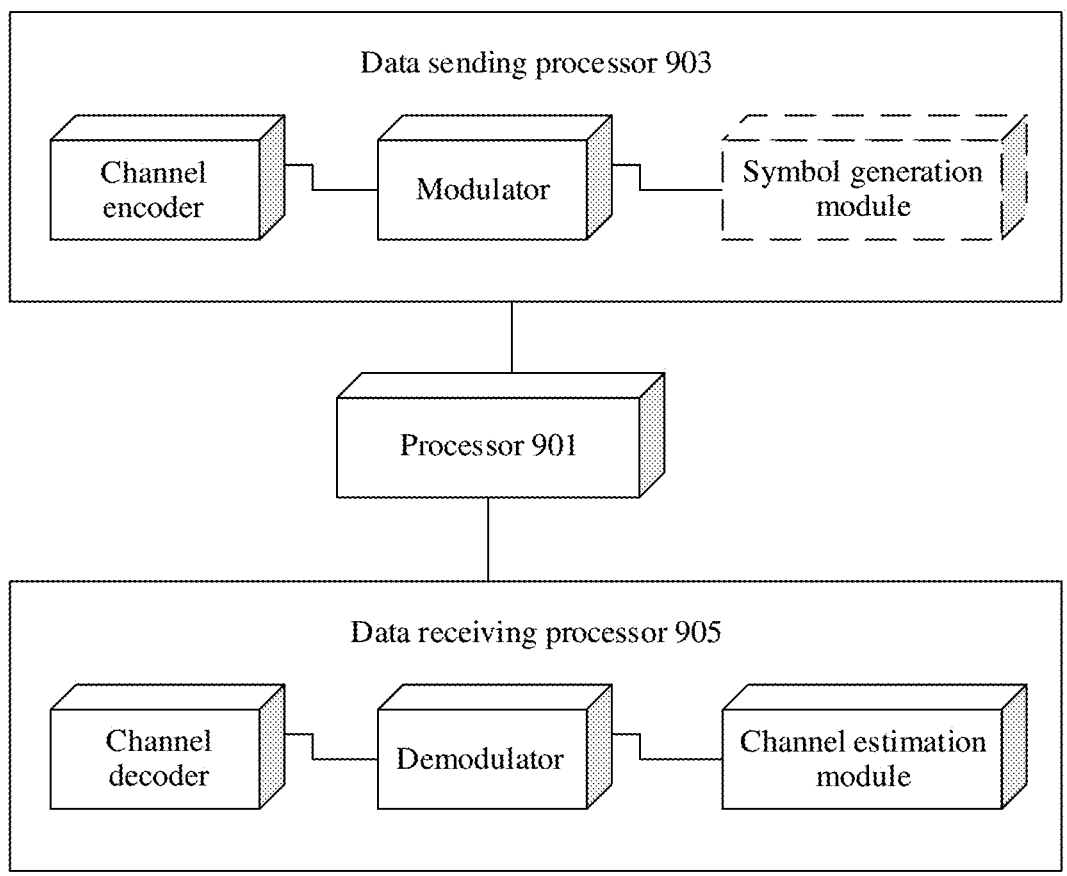
FIG. 15 is a schematic structural diagram of another device according to an embodiment of this application.

For the communications apparatus or the terminal in the embodiments of this application, refer to a device shown in FIG. 15. In an example, the device may implement a function similar to that of the processor in FIG. 14. In FIG. 15, the device includes a processor, a data sending processor, and a data receiving processor. In FIG. 15, the processing unit may be the processor 901, and completes a corresponding function. The sending unit may be the data sending processor 903 in FIG. 15, and the receiving unit may be the data receiving processor 905 in FIG. 15. Although FIG. 15 shows a channel encoder and a channel decoder, it may be understood that the modules are merely an example, and do not constitute a limitation on this embodiment.

Figure 16:
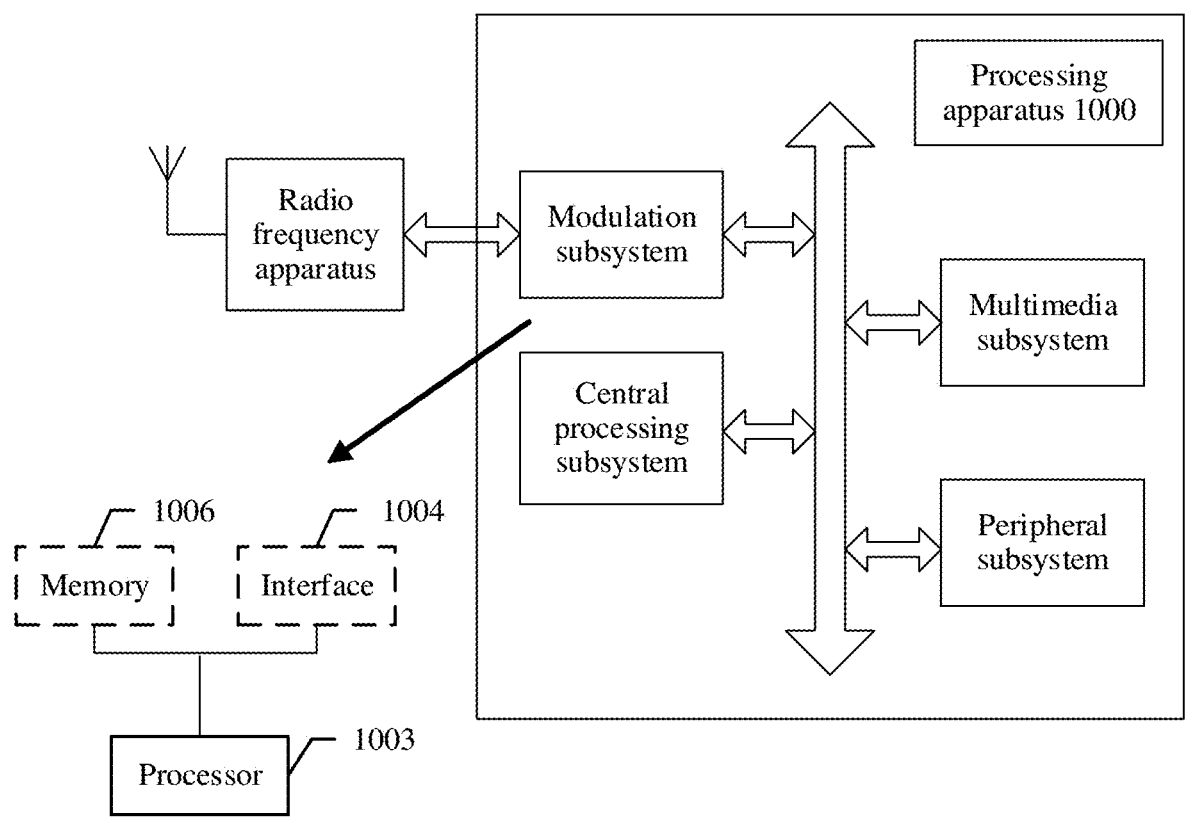
FIG. 16 is a schematic structural diagram of a processing apparatus according to an embodiment of this application.

FIG. 16 shows another form of this embodiment. A processing apparatus 1000 includes modules such as a modulation subsystem, a central processing subsystem, and a peripheral subsystem. The terminal or the communications apparatus in this embodiment may be used as the modulation subsystem in the processing apparatus 1000. Specifically, the modulation subsystem may include a processor 1003 and an interface 1004. The processor 1003 implements a function of the foregoing processing unit, and the interface 1004 implements a function of the foregoing sending unit and/or receiving unit. In another variant, the modulation subsystem includes a memory 1006, a processor 1003, and a program that is stored in the memory and that can run on the processor. When executing the program, the processor implements the measurement method or the information processing method in the foregoing embodiments. It should be noted that the memory 1006 may be non-volatile or volatile, and may be located inside the modulation subsystem or in the processing apparatus 1000, provided that the memory 1006 can be connected to the processor 1003.

In another form of this embodiment, a computer-readable storage medium is provided. The computer-readable storage medium stores an instruction, and when the instruction is executed, related functions of the terminal in the measurement method or the information processing method in the foregoing embodiments are performed.

Figure 17:
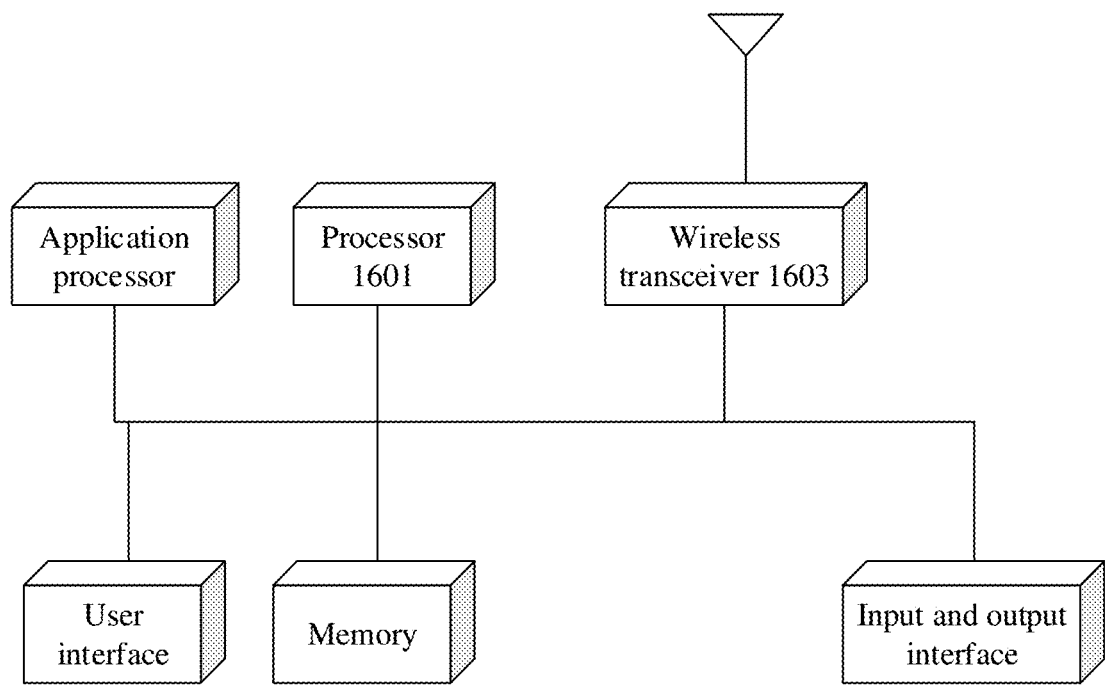
FIG. 17 is a schematic structural diagram of still another device according to an embodiment of this application.

For the network device in this embodiment, refer to a device shown in FIG. 17. The device includes a processor 1601, an application processor, a memory user interface, and some other elements (including a device such as a power supply that is not shown). In FIG. 17, the processing unit may be the processor 1601, and completes a corresponding function. The sending unit and/or the receiving unit may be a radio transceiver 1603 in the figure, and the radio transceiver 1603 implements a corresponding function through an antenna. It may be understood that the elements shown in the figure are merely an example, and are not mandatory elements for implementing the embodiments.

Figure 18:
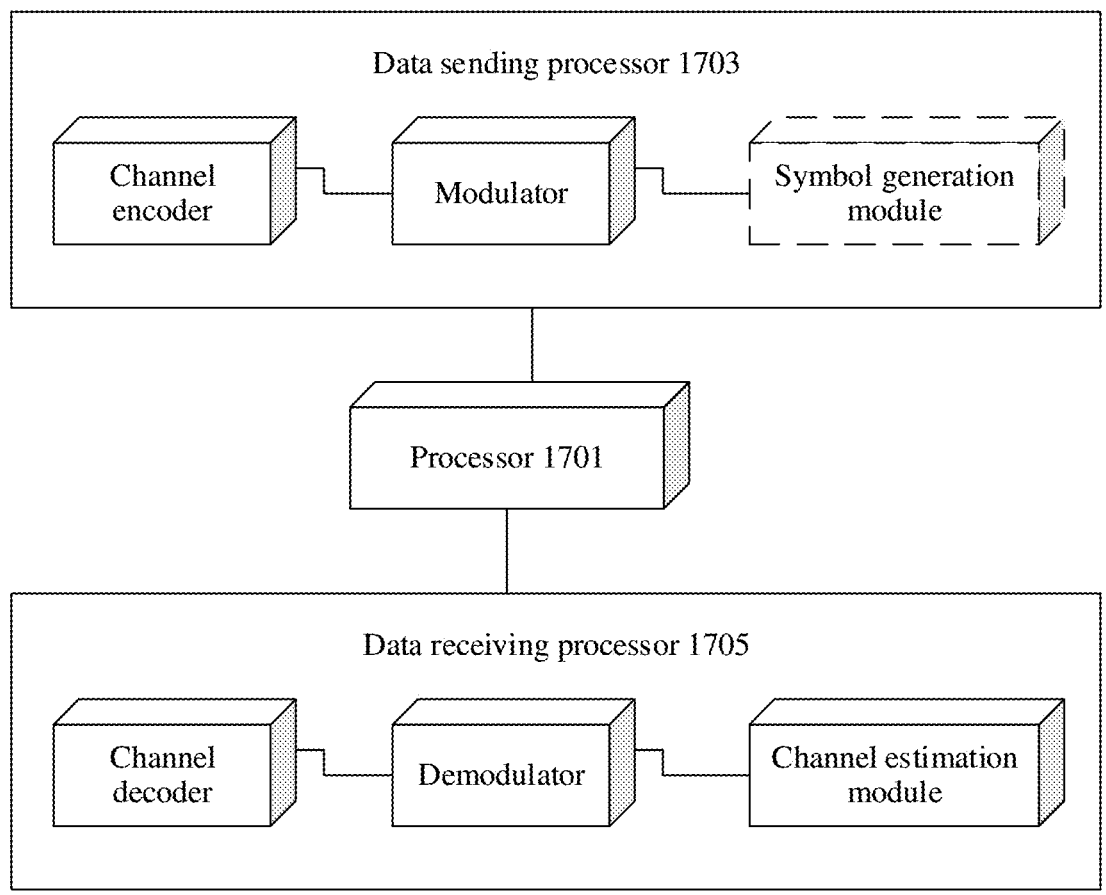
FIG. 18 is a schematic structural diagram of yet another device according to an embodiment of this application.

For the network device in this embodiment, refer to a device shown in FIG. 18. In an example, the device may implement a function similar to that of the processor in FIG. 18. In FIG. 18, the device includes a processor, a data sending processor, and a data receiving processor. In FIG. 18, the processing unit may be the processor 1701, and completes a corresponding function. The sending unit may be the data sending processor 1703 in FIG. 18, and the receiving unit may be the data receiving processor 1705 in FIG. 18. Although FIG. 18 shows a channel encoder and a channel decoder, it may be understood that the modules are merely an example, and do not constitute a limitation on this embodiment.

Figure 19:
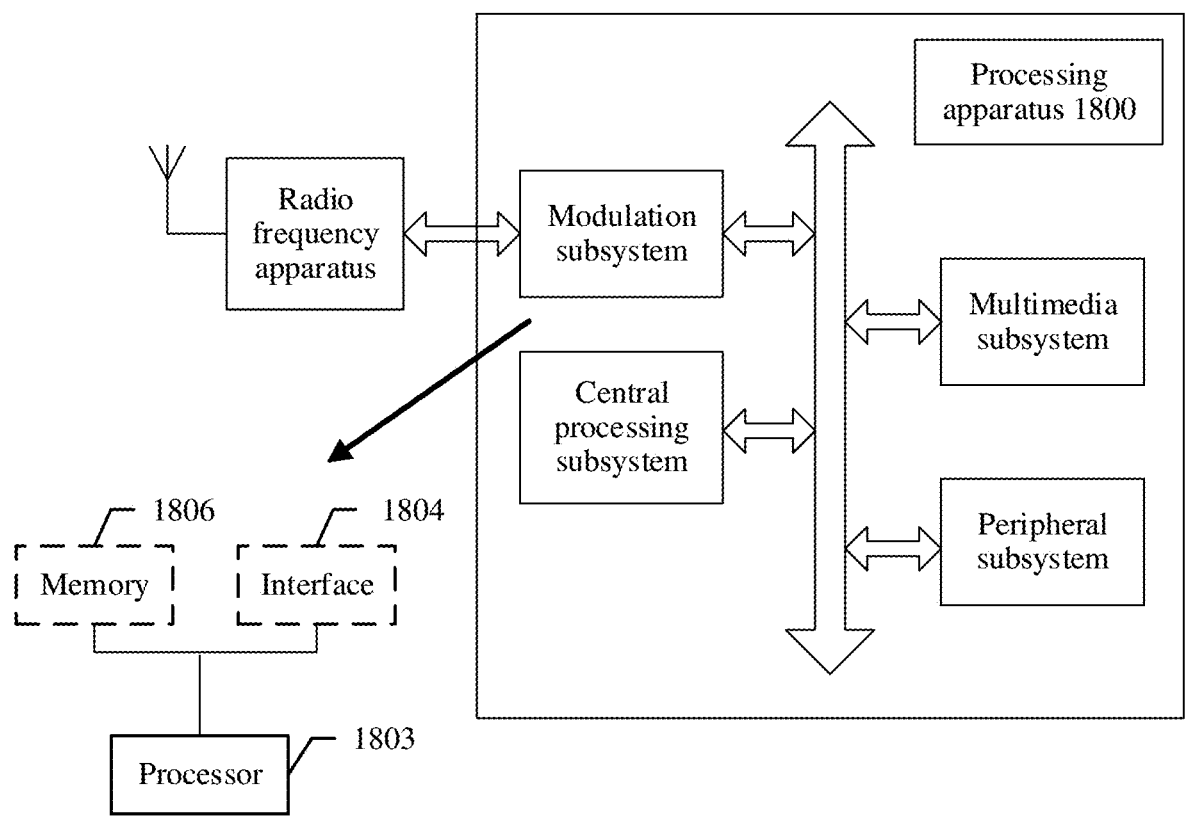
FIG. 19 is a schematic structural diagram of another apparatus according to an embodiment of this application.

FIG. 19 shows another form of the embodiments of this application. A processing apparatus 1800 includes modules such as a modulation subsystem, a central processing subsystem, and a peripheral subsystem. The network device in this embodiment may be used as the modulation subsystem in the processing apparatus 1800. Specifically, the modulation subsystem may include a processor 1803 and an interface 1804. The processor 1803 completes a function of the processing unit, and the interface 1804 completes a function of the sending unit and/or the receiving unit. In another variant, the modulation subsystem includes a memory 1806, a processor 1803, and a program that is stored in the memory and that can run on the processor. When executing the program, the processor implements related functions of the network device in the measurement method or the information processing method in the foregoing embodiments. It should be noted that the memory 1806 may be non-volatile or volatile, and may be located inside the modulation subsystem or in the processing apparatus 1800, provided that the memory 1806 can be connected to the processor 1803.

In another form of the embodiments of this application, a computer-readable storage medium is provided. The computer-readable storage medium stores an instruction, and when the instruction is executed, a related function of the network device in the measurement method or the information processing method in the foregoing embodiments is performed.

It should be understood that in the embodiments of this application, the processor may be a central processing unit ("CPU" for short), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data for the processor. A part of the memory may further include a non-volatile random access memory.

In an implementation process, the steps in the foregoing methods may be implemented by using a hardware integrated logical circuit in the processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

According to the methods in the embodiments of this application, a communications system is further provided in an embodiment of this application. The communications system includes the foregoing one or more network devices and one or more terminals or terminal devices.

The apparatus in the embodiments of this application may alternatively be a universal processing system, and for example, the apparatus may be generally referred to as a chip. The universal processing system includes one or more microprocessors that provide a processor function and an external memory that provides at least a part of a storage medium.

It should further be understood that "first", "second", "third", and "fourth" and various digital numbers in this specification are merely for differentiation for ease of description, and are not intended to limit the scope of the embodiments of the present invention.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

A person of ordinary skill in the art may be aware that, in combination with illustrative logical blocks and steps described in the embodiments disclosed in this specification, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, function units in the embodiments of the present invention may be integrated into one processing unit, or each of the units may exist alone physically, or two or more units are integrated into one unit.

All or a part of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid-State Disk)), or the like.

What is claimed is:

1. A communication method, comprising:
   sending, by a first base station, a first message to a second base station; and
   receiving, by the first base station in response to sending the first message, a second message from the second base station, wherein the second message comprises:
   a cell list including information on cells included by the second base station; and
   information about whether each cell in the cell list is a non-independent cell, wherein a physical broadcast channel (PBCH) of a synchronization signal block (SSB) of the non-independent cell does not carry location information of system information block 1 (SIB 1), and the non-independent cell is a cell in which no SIB 1 is sent.

2. The method according to claim 1, wherein the method further comprises:
   sending, by the first base station, a third message to a terminal device, wherein the third message requests a cell global identifier of a first cell, and the third message includes a first frequency of the first cell and a first physical cell identifier (PCI) indicating the first cell; and
   wherein the second base station is a target network device indicated by the cell global identifier of the first cell.

3. The method according to claim 2, wherein the method further comprises:
   receiving, by the first base station, a fourth message in response to the third message, wherein the fourth message includes the cell global identifier of the first cell.

4. The method according to claim 1, wherein the cell list comprise a first non-independent cell; and
   wherein the first non-independent cell is a cell in which no system information is sent or a cell in which a part of system information is sent; or
   or
   wherein the first non-independent cell is not capable of working as a primary component carrier.

5. The method according to claim 1, wherein the information about whether each cell in the cell list is the non-independent cell comprises:
   information about whether each cell in the cell list is the non-independent cell or an independent cell.

6. The method of claim 1, wherein the second message further comprises:
   a frequency of each cell in the cell list;
   a physical cell identifier of each cell in the cell list;
   a cell global identifier of each cell in the cell list; or
   a cell in the cell list that does not send cell system information.

7. The method according to claim 1, wherein the PBCH of the SSB of the non-independent cell carries location information of an SSB of another cell different from the non-independent cell.

8. A communication method, comprising:
   receiving, by a second base station, a first message from a first base station; and sending, by the second base station in response to receiving the first message, a second message to the first base station, wherein the second message comprises:
  a cell list including information on cells included by the second base station; and
  information about whether each cell in the cell list is a non-independent cell, wherein a physical broadcast channel (PBCH) of a synchronization signal block (SSB) of the non-independent cell does not carry location information of system information block 1 (SIB 1), and the non-independent cell is a cell in which no SIB 1 is sent.

9. The method according to claim 8, wherein the cell list comprise a first non-independent cell; and
  wherein the first non-independent cell is a cell in which no system information is sent or a part of system information is sent; or
  wherein the first non-independent cell is not capable of working as a primary component carrier.

10. The method according to claim 8, wherein the information about whether each cell in the cell list is the non-independent cell comprises:
  information about whether each cell in the cell list is the non-independent cell or an independent cell.

11. The method of claim 8, wherein the second message further comprises:
  a frequency of each cell in the cell list;
  a physical cell identifier of each cell in the cell list;
  a cell global identifier of each cell in the cell list; or
  a cell in the cell list that does not send cell system information.

12. The method according to claim 8, wherein the PBCH of the SSB of the non-independent cell carries location information of an SSB of another cell different from the non-independent cell.

13. An apparatus, comprising: one or more processors, and a non-transitory computer-readable storage medium storing program instructions; wherein, when executed by the one or more processors, the instructions cause the apparatus to perform:
  sending a first message to a second base station; and
  receiving, in response to sending the first message, a second message from the second base station, wherein the second message comprises:
  a cell list including information on cells included by the second base station; and
  information about whether each cell in the cell list is a non-independent cell, wherein a physical broadcast channel (PBCH) of a synchronization signal block (SSB) of the non-independent cell does not carry location information of system information block 1 (SIB 1), and the non-independent cell is a cell in which no system information block 1 (SIB 1) is sent.

14. The apparatus according to claim 13, wherein the instructions further cause the apparatus to:
  send a third message to a terminal device, wherein the third message requests a cell global identifier of a first cell, and the third message includes a first frequency of the first cell and a first physical cell identifier (PCI) indicating the first cell; and
  wherein the second base station is a target network device indicated by the cell global identifier of the first cell.

15. The apparatus according to claim 14, wherein the instructions further cause the apparatus to:
  receive a fourth message in response to the third message, wherein the fourth message includes the cell global identifier of the first cell.

16. The apparatus according to claim 13, wherein the cell list comprise a first non-independent cell; and
  wherein the first non-independent cell is a cell in which no system information is sent or a cell in which a part of system information is sent; or
  wherein the first non-independent cell is not capable of working as a primary component carrier.

17. The apparatus according to claim 13, wherein the information about whether each cell in the cell list is the non-independent cell comprises:
  information about whether each cell in the cell list is the non-independent cell or an independent cell.

18. The apparatus according to claim 13, wherein the PBCH of the SSB of the non-independent cell carries location information of an SSB of another cell different from the non-independent cell.

19. An apparatus, comprising: one or more processors, and a non-transitory computer-readable storage medium storing program instructions; wherein, when executed by the one or more processors, the instructions cause the apparatus to perform:
  receiving a first message from a first base station; and
  sending, in response to receiving the first message, a second message to the first base station, wherein the second message comprises:
  a cell list including information on cells included by the apparatus; and
  information about each cell in the cell list is a non-independent cell, wherein a physical broadcast channel (PBCH) of a synchronization signal block (SSB) of the non-independent cell does not carry location information of system information block 1 (SIB 1), and the non-independent cell is a cell in which no system information block 1 (SIB 1) is sent.

20. The apparatus according to claim 19, wherein the cell list comprise a first non-independent cell; and
  wherein the first non-independent cell is a cell in which no system information is sent or a part of system information is sent; or
  wherein the first non-independent cell is not capable of working as a primary component carrier.

21. The apparatus according to claim 19, wherein the information about whether each cell in the cell list is the non-independent cell comprises:
  information about whether each cell in the cell list is the non-independent cell or an independent cell.

22. The apparatus according to claim 19, wherein the PBCH of the SSB of the non-independent cell carries location information of an SSB of another cell different from the non-independent cell.

23. A communication method, comprising:
  sending, by a first base station, a first message to a second base station;
  receiving, by the second base station, the first message from the first base station;
  sending, by the second base station in response to receiving the first message, a second message to the first base station;
  receiving, by the first base station, the second message from the second base station, wherein the second message comprises:
  a cell list including information on cells included by the second base station; and
  information about whether each cell in the cell list is a non-independent cell, wherein a physical broadcast channel (PBCH) of a synchronization signal block (SSB) of the non-independent cell does not carry location information of system information block 1 (SIB 1), and the non-independent cell is a cell in which no SIB 1 is sent.

24. A communication system, comprising a first base station and a second base station, wherein
- the first base station is configured to send a first message to the second base station;
- the second base station is configured to receive the first message from the first base station;
- the second base station is further configured to send a second message to the first base station in response to receiving the first message;
- the first base station is further configured to receive the second message from the second base station, wherein the second message comprises:
- a cell list including information on cells included by the second base station; and
- information about whether each cell in the cell list is a non-independent cell, wherein a physical broadcast channel (PBCH) of a synchronization signal block (SSB) of the non-independent cell does not carry location information of system information block 1 (SIB 1), and the non-independent cell is a cell in which no system information block 1 (SIB 1) is sent.

* * * * *

UNITED STATES PATENT AND TRADEMARK OFFICE
CERTIFICATE OF CORRECTION

PATENT NO. : 11,818,601 B2
APPLICATION NO. : 17/039351
DATED : November 14, 2023
INVENTOR(S) : Li et al.

It is certified that error appears in the above-identified patent and that said Letters Patent is hereby corrected as shown below:

In the Specification

In Column 22, Line 23, delete "no," and insert -- 110, --.

In Column 22, Line 26, delete "no," and insert -- 110, --.

Signed and Sealed this
Ninth Day of January, 2024

Katherine Kelly Vidal
*Director of the United States Patent and Trademark Office*